(12) United States Patent
Sonobe et al.

(10) Patent No.: US 10,411,261 B2
(45) Date of Patent: Sep. 10, 2019

(54) CARBONACEOUS MATERIAL FOR NON-AQUEOUS ELECTROLYTE SECONDARY BATTERY ANODES

(71) Applicant: Kureha Corporation, Tokyo (JP)

(72) Inventors: Naohiro Sonobe, Tokyo (JP); Kazuhiko Shimizu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/501,970

(22) PCT Filed: Aug. 10, 2015

(86) PCT No.: PCT/JP2015/072666
§ 371 (c)(1),
(2) Date: Feb. 6, 2017

(87) PCT Pub. No.: WO2016/021736
PCT Pub. Date: Feb. 11, 2016

(65) Prior Publication Data
US 2017/0229708 A1 Aug. 10, 2017

(30) Foreign Application Priority Data
Aug. 8, 2014 (JP) .................................. 2014-163110

(51) Int. Cl.
*H01M 4/587* (2010.01)
*C01B 32/05* (2017.01)
*H01M 4/02* (2006.01)

(52) U.S. Cl.
CPC ............ *H01M 4/587* (2013.01); *C01B 32/05* (2017.08); *C01P 2004/61* (2013.01); *C01P 2006/10* (2013.01); *C01P 2006/12* (2013.01); *C01P 2006/40* (2013.01); *C01P 2006/80* (2013.01); *H01M 2004/021* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 5,616,436 A | 4/1997 | Sonobe et al. | |
| 5,985,489 A | 11/1999 | Ohsaki et al. | |
| 5,989,744 A * | 11/1999 | Yamaura ............... | H01M 4/525 429/223 |
| 6,303,249 B1 | 10/2001 | Sonobe et al. | |
| 6,316,144 B1 | 11/2001 | Xue et al. | |
| 6,335,122 B1 | 1/2002 | Yamada et al. | |
| 6,686,048 B1 | 2/2004 | Arimoto et al. | |
| 7,759,289 B2 | 7/2010 | Iwasaki et al. | |
| 7,858,239 B2 | 12/2010 | Shimizu et al. | |
| 8,728,668 B2 | 5/2014 | Kawai et al. | |
| 8,926,932 B2 | 1/2015 | Pfeifer et al. | |
| 2002/0048144 A1 | 4/2002 | Sugo et al. | |
| 2002/0061445 A1 | 5/2002 | Kitagawa et al. | |
| 2005/0152890 A1 | 7/2005 | Sonobe et al. | |
| 2005/0266990 A1 | 12/2005 | Iwasaki et al. | |
| 2006/0078796 A1 | 4/2006 | Ozaki et al. | |
| 2007/0287068 A1 | 12/2007 | Shimizu et al. | |
| 2008/0207442 A1 | 8/2008 | Pfeifer et al. | |
| 2008/0274406 A1 | 11/2008 | Fuse et al. | |
| 2009/0297953 A1 | 12/2009 | Shimizu et al. | |
| 2010/0086856 A1 | 4/2010 | Matsumoto et al. | |
| 2010/0297500 A1 | 11/2010 | Kawai et al. | |
| 2011/0111294 A1 | 5/2011 | Lopez et al. | |

(Continued)

FOREIGN PATENT DOCUMENTS

| CN | 1255144 A | 5/2000 |
|---|---|---|
| CN | 1705148 A | 12/2005 |

(Continued)

OTHER PUBLICATIONS

JPH09204918A—English translation (Year: 1996).*
JP2006264991—English translation (Year: 2006).*
Office Action dated Oct. 11, 2016, in Taiwan Patent Application No. 104123319, with English translation.
Extended European Search Report dated Jun. 20, 2017, in European Patent Application No. 15830721.5.
Notification of Reasons for Rejection issued in corresponding JP Application No. 2016-540770, dated Dec. 5, 2017, with English language translation.
International Search Report of PCT/JP2015/072666 dated Nov. 10, 2015.

(Continued)

*Primary Examiner* — Haroon S. Sheikh
(74) *Attorney, Agent, or Firm* — Birch, Stewart, Kolasch & Birch, LLP

(57) ABSTRACT

A non-aqueous electrolyte secondary battery having a charge/discharge capacity, and a small irreversible capacity, which is a difference between a doping capacity and a de-doping capacity, and utilizing an active material efficiently, is provided. Such a non-aqueous electrolyte secondary battery can be provided by using a carbonaceous material for a non-aqueous electrolyte secondary battery anode of the present invention, a production method of which includes:
(1) impregnating an alkali metal to a carbonaceous material precursor by adding a compound including an elemental alkali metal to obtain an alkali-impregnated carbonaceous precursor;
(2) subjecting the alkali-impregnated carbonaceous precursor to heat treatment by:
(a) subjecting the alkali-impregnated carbonaceous precursor to main heat treatment in a non-oxidizing gas atmosphere at a temperature from 800° C. to 1500° C.;
wherein a true density is from 1.35 to 1.60 g/cm$^3$;
a specific surface area obtained by BET method using nitrogen adsorption is not greater than 30 m$^2$/g;
an average particle size is not greater than 50 µm; and
an atomic ratio of hydrogen and carbon obtained by elemental analysis, H/C, is not greater than 0.1.

8 Claims, No Drawings

(56) References Cited

U.S. PATENT DOCUMENTS

| | | |
|---|---|---|
| 2012/0070733 A1 | 3/2012 | Yamada et al. |
| 2012/0328954 A1 | 12/2012 | Okabe et al. |
| 2013/0003261 A1 | 1/2013 | Remizov et al. |
| 2013/0302692 A1 | 11/2013 | Suzuki et al. |
| 2014/0050982 A1 | 2/2014 | Lu et al. |
| 2014/0178761 A1 | 6/2014 | Lu et al. |
| 2014/0356708 A1 | 12/2014 | Arikawa et al. |
| 2015/0024277 A1 | 1/2015 | Komatsu et al. |
| 2015/0171470 A1 | 6/2015 | Kobayashi et al. |
| 2015/0180020 A1 | 6/2015 | Komatsu et al. |
| 2015/0263347 A1 | 9/2015 | Imaji et al. |
| 2015/0357637 A1 | 12/2015 | Yamanoi et al. |
| 2016/0064735 A1 | 3/2016 | Tada et al. |
| 2016/0268590 A1 | 9/2016 | Koshima et al. |
| 2017/0125811 A1 | 5/2017 | Imaji et al. |
| 2017/0141380 A1 | 5/2017 | Aoki et al. |
| 2017/0141396 A1 | 5/2017 | Tabata et al. |
| 2017/0229708 A1 | 8/2017 | Sonobe et al. |
| 2017/0237070 A1 | 8/2017 | Sonobe et al. |
| 2017/0237071 A1 | 8/2017 | Sonobe et al. |
| 2018/0261875 A1 | 9/2018 | Imaji et al. |

FOREIGN PATENT DOCUMENTS

| | | |
|---|---|---|
| CN | 102630355 A | 8/2012 |
| CN | 104641499 A | 5/2015 |
| CN | 106133953 A | 11/2016 |
| EP | 0700105 A2 | 3/1996 |
| EP | 2 144 321 A1 | 1/2010 |
| EP | 2892096 A1 | 7/2015 |
| EP | 3 128 582 A1 | 2/2017 |
| JP | S57208079 A | 12/1982 |
| JP | S58209864 A | 12/1983 |
| JP | 3-252053 A | 11/1991 |
| JP | 8-64207 A | 3/1996 |
| JP | 8-236116 A | 9/1996 |
| JP | 9-7598 A | 1/1997 |
| JP | H09204918 A | 8/1997 |
| JP | 2000-315500 A | 11/2000 |
| JP | 2000-327441 A | 11/2000 |
| JP | 2001-229926 A | 8/2001 |
| JP | 2002-104817 A | 4/2002 |
| JP | 2002-241117 A | 8/2002 |
| JP | 2005-132702 A | 5/2005 |
| JP | 2006264991 A | 10/2006 |
| JP | 2006264993 A | 10/2006 |
| JP | 2008-10337 A | 1/2008 |
| JP | 2008-297201 A | 12/2008 |
| JP | 2010-509174 A | 3/2010 |
| JP | 2013-534024 A | 8/2013 |
| JP | 2016-178049 A | 7/2015 |
| JP | 2016-152222 A | 8/2016 |
| KR | 10-2002-0009514 A | 2/2002 |
| KR | 10-2009-0016462 A | 2/2009 |
| KR | 10-2013-0008532 A | 1/2013 |
| KR | 10-2013-0062291 A | 6/2013 |
| KR | 10-2015-0030731 A | 3/2015 |
| TW | 200501484 A | 1/2005 |
| TW | 200723579 A | 6/2007 |
| TW | 200945651 A | 11/2009 |
| WO | WO9701192 A1 | 1/1997 |
| WO | 98/44580 A1 | 10/1998 |
| WO | WO 2004/114443 A1 | 12/2004 |
| WO | WO 2005/098999 A1 | 10/2005 |
| WO | WO 2008/058231 A2 | 5/2008 |
| WO | 2011/056847 A2 | 5/2011 |
| WO | 2011/148156 A1 | 12/2011 |
| WO | WO 2012/087698 A1 | 6/2012 |
| WO | WO 2013/118757 A1 | 8/2013 |
| WO | 2014/034857 A1 | 3/2014 |
| WO | 2014/034858 A1 | 3/2014 |
| WO | WO 2014/038492 A1 | 3/2014 |
| WO | 2014/112401 A1 | 7/2014 |
| WO | 2015/059892 A1 | 4/2015 |
| WO | 2016/021737 A1 | 2/2016 |

OTHER PUBLICATIONS

Chinese Notification of the First Office Action (including an English translation thereof) issued in the corresponding Chinese Patent Application No. 201580041493.6 dated Sep. 5, 2018.
Chinese Office Action and Search Report dated Oct. 9, 2018 for Application No. 201580042307.0, along with English translations.
European Office Action dated Jan. 24, 2018 for Application No. 15830384.2.
European Office Action dated Jan. 25, 2018 for Application No. 15829774.7.
Extended European Search Report dated Apr. 13, 2017 for Application No. 15830384.2.
Extended European Search Report dated Apr. 18, 2017 for Application No. 15829774.7.
International Search Report dated Nov. 10, 2015 for Application No. PCT/JP2015/072667, along with an English translation.
International Search Report dated Nov. 10, 2015 for Application No. PCT/JP2015/072668, along with an English translation.
Japanese Office Action dated Dec. 5, 2017 for Application No. 2016-540771, along with an English translation.
Japanese Office Action dated Jan. 23, 2018 for Application No. 2016-540772, along with an English translation.
Japanese Office Action dated Oct. 10, 2017 for Application No. 2016-540772, along with an English translation.
Japnese Office Action dated Jul. 24, 2018 for Application No. 2016-540772, along with an English translation.
Korean Office Action dated Apr. 18, 2018 for Application No. 10-2017-7003065, along with an English translation.
Taiwanese Office Action and Search Report dated Apr. 19, 2016 for Application No. 104123322, along with an English translation.
Taiwanese Office Action and Search Report dated Jan. 4, 2017 for Application No. 104123324, along with English translations.
Third Party Observation for European Application No. 15830384.2 issued Apr. 17, 2018.
Third Party Observation issued in U.S. Appl. No. 15/501,982 on Feb. 13, 2018.
U.S. Office Action dated Sep. 17, 2018 for U.S. Appl. No. 15/502,024.
U.S. Office Action dated Sep. 26, 2018 for U.S. Appl. No. 15/501,982.
Korean Notice of Reason for Rejection (including an English translation thereof) issued in the Korean Patent Application No. 10-2017-7003070 dated Jan. 21, 2019.
Korean Notice of Preliminary Rejection for Korean Application No. 10-2017-7003245, dated Feb. 18, 2019, with English translation.
U.S. Office Action issued in U.S. Appl. No. 15/502,024 dated Mar. 6, 2019.
Chinese Office Action and Search Report for Chinese Application No. 201580042307.0, dated Apr. 4, 2019 with English translation.
Chinese Office Action and Search Report for Chinese Application No. 201680050003.3, dated Oct. 9, 2018.
Chinese Office Action for Chinese Application No. 201680050003.3, dated April 19, 2019, with English translation.
Extended European Search Report for European Application No. 16851319.0, dated Jul. 25, 2018.
International Preliminary Report on Patentability and Englisg translation of the Written Opinion of the International Searching Authority for International Application No. PCT/JP2016/077881, dated Apr. 3, 2018.
Korean Office Action for Korean Application No. 10-2018-7006096, dated Jun. 16, 2018.
U.S. Office Action for U.S. Appl. No. 15/501,982, dated Apr. 17, 2019.
U.S. Office Action for U.S Appl. No. 15/756,183, dated Nov. 6, 2018.
U.S. Office Action issued in U.S. Appl. No. 15/756,183 dated May 16, 2019.

* cited by examiner

CARBONACEOUS MATERIAL FOR NON-AQUEOUS ELECTROLYTE SECONDARY BATTERY ANODES

TECHNICAL FIELD

The present invention relates to a carbonaceous material for an anode of a non-aqueous electrolyte secondary battery. According to the present invention, a carbonaceous material for a non-aqueous electrolyte secondary battery anode for a non-aqueous electrolyte secondary battery that has a large charge-discharge capacity and exhibits excellent charge/discharge efficiency can be provided.

BACKGROUND ART

As more functionalities are implemented in a small mobile devices such as cell-phones and notebook-size personal computers, a secondary battery used as a power source thereof is expected to have a larger energy density. As a secondary battery that has a larger energy density, a non-aqueous solvent-type lithium secondary battery which utilizes a carbonaceous material as an anode has been proposed (Patent Document 1).

In recent years, large secondary batteries, having large energy density and excellent output energy characteristics are mounted on electric vehicles in response to increasing concern over environmental issues. For example, use of such secondary batteries is anticipated in vehicle applications such as in electric vehicles (EV), which are driven solely by motors, and plug-in hybrid electric vehicles (PHEV) or hybrid electric vehicles (HEV) in which internal combustion engines and motors are combined. In particular, a lithium-ion secondary battery, which is a non-aqueous solvent-type lithium secondary battery, is used widely as a secondary battery having a large energy density. Further increase in energy density is expected so that a longer cruising distance at one charging can be achieved for the EV use.

Although larger energy density requires an increase in doping and de-doping capacity of lithium into an anode material, the theoretical lithium impregnating capacity for a graphitic material, which is commonly used as an anode material today, is 372 Ah/kg. This is the theoretical upper limit for a graphitic material. Furthermore, if a graphitic material is used to configure an electrode, a graphite intercalation compound is formed upon lithium doping into the graphitic material, thereby increasing a layer spacing. De-doping of the lithium doped between layers can restore the layer spacing. Accordingly, such an increase and restoration in the layer spacing may occur repeatedly in a graphitic material with a developed graphite structure, by repeated events of doping and de-doping of lithium (i.e. repeated charging and discharging in the case of a secondary battery), leading to a possible disintegration of graphite crystal. Therefore, it is speculated that the secondary battery configured with a graphite or a graphitic material with a developed graphite structure exhibits inferior performance in repeated charging and discharging. For a battery in which a graphitic material with a developed graphite structure is used, another problem is also addressed: an electrolyte solution tends to decompose during the battery operation.

Alternatively, an anode material of alloy-type, such as tin and silicon, which exhibits large capacity, is also proposed. However, it does not have enough durability, and its usage is limited.

In contrast, a non-graphitic carbon material exhibits superior durability and possesses a greater capacity per weight than the theoretical lithium impregnating capacity of a graphitic material. Therefore, various proposals as a large-capacity anode material have been made so far. The use of a carbonaceous material obtained by subjecting phenol resin to heat treatment as an anode in a secondary battery has been proposed, for example (Patent Document 2). However, there has been a problem with such a carbonaceous material. An anode produced using a carbonaceous material obtained by subjecting phenol resin to heat treatment at a high temperature (e.g. 1900° C. or higher) can achieve only small doping and de-doping capacity of an active material such as lithium into an anode material. On the other hand, if an anode is produced using a carbonaceous material obtained by subjecting phenol resin to heat treatment at a relatively low temperature (e.g. from approximately 480° C. to 700° C.), the doping capacity of lithium, which is an active material, is large. This material is preferable in this aspect. However, lithium doped into an anode carbon may not be completely de-doped and a large amount of lithium may remain in the anode carbon. Such a wasteful consumption of lithium, which is an active material, is a problem.

Alternatively, a method of manufacturing a carbon for a lithium secondary battery is proposed (Patent Document 3). The method includes:

contacting a dry-distilled charcoal with a gas which contains halogen thereby providing a halogenated dry-distilled charcoal;

removing a portion or all of said halogen in said halogenated dry-distilled charcoal thereby obtaining de-halogenated charcoal; and contacting a thermally decomposable hydrocarbon with said de-halogenated charcoal, thereby adjusting the pores of the carbon product prepared. With this method, a large doping and de-doping capacity can be achieved. However, lithium doped into an anode carbon may not be completely de-doped and a large amount of lithium may remain in the anode carbon. Such a wasteful consumption of lithium, which is an active material, is a problem.

CITATION LIST

Patent Literature

Patent Document 1: Japanese Unexamined Patent Application Publication No. 557-208079A Patent Document 2: Japanese Unexamined Patent Application Publication No. S58-209864A Patent Document 3: WO 97/01192

Patent Document 4: Japanese Unexamined Patent Application Publication No. H9-204918A Patent Document 5: Japanese Unexamined Patent Application Publication No. 2006-264991A Patent Document 6: Japanese Unexamined Patent Application Publication No. 2006-264993A

SUMMARY OF INVENTION

Technical Problem

A non-aqueous electrolyte secondary battery having a large charge/discharge capacity, and a small irreversible capacity, which is a difference between a doping capacity and a de-doping capacity, and utilizing an active material efficiently, is provided. In addition, a carbonaceous material used for the secondary battery electrode described above and a method of producing such a carbonaceous material are also provided.

Solution to Problem

The present inventors conducted a diligent research on a non-aqueous electrolyte secondary battery with a large charge-discharge capacity and a small irreversible capacity and surprisingly discovered a non-aqueous electrolyte secondary battery including a carbonaceous material, a true density of which is from 1.35 to 1.60 g/cm$^3$, produced by a certain production method can exhibit a large discharge capacity. Specifically, the present inventors discovered that a carbonaceous material obtained by adding a compound containing an elemental alkali metal to a carbon precursor and subjecting such a precursor to heat treatment exhibits a superior discharge capacity when used as an active material in an anode of a non-aqueous electrolyte secondary battery.

The present invention is based on such knowledge.

Thus, the following are provided in the present invention.

[1] A carbonaceous material for a non-aqueous electrolyte secondary battery anode obtained by a method of producing the carbonaceous material including:

(1) impregnating an alkali metal to a carbonaceous material precursor by adding a compound including an elemental alkali metal to obtain an alkali-metal-compound-impregnated carbonaceous material precursor (may be referred to as an "alkali-impregnated carbonaceous precursor" hereafter) (this step may be referred to as the "alkali-impregnating step" hereafter);

(2) subjecting the alkali-impregnated carbonaceous precursor to heat treatment by:

(a) subjecting the alkali-impregnated carbonaceous precursor to main heat treatment in a non-oxidizing gas atmosphere at a temperature from 800° C. to 1500° C.; or (b) subjecting the alkali-impregnated carbonaceous precursor to pre-heat treatment in a non-oxidizing gas atmosphere at a temperature 400° C. or higher and lower than 800° C., and subjecting the alkali-impregnated carbonaceous precursor to main heat treatment in a non-oxidizing gas atmosphere at a temperature from 800° C. to 1500° C.;

wherein a true density of the carbonaceous material is from 1.35 to 1.60 g/cm$^3$; a specific surface area of the carbonaceous material obtained by BET method using nitrogen adsorption is not greater than 30 m$^2$/g;

an average particle size of the carbonaceous material is not greater than 50 μm; and an atom ratio of hydrogen and carbon of the carbonaceous material obtained by elemental analysis, H/C, is not greater than 0.1.

[2] The carbonaceous material according to [1], wherein a source of carbon for the carbonaceous material precursor is a petroleum pitch or tar, a coal pitch or tar, a thermoplastic resin or a thermosetting resin.

[3] The carbonaceous material according to [1] or [2], wherein:

heat treatment step (2) (a) is:

(2) subjecting the alkali-impregnated carbonaceous precursor to heat treatment by:

(a1) subjecting the alkali-impregnated carbonaceous precursor to main heat treatment in a non-oxidizing gas atmosphere at a temperature from 800° C. to 1500° C. and removing an alkali metal or a compound including an elemental alkali metal by washing; and heat treatment step (2) (b) is:

(2) subjecting the alkali-impregnated carbonaceous precursor to heat treatment by:

(b1) subjecting the alkali-impregnated carbonaceous precursor to pre-heat treatment in a non-oxidizing gas atmosphere at a temperature 400° C. or higher and lower than 800° C., removing an alkali metal or a compound including an elemental alkali metal by washing, and subjecting the alkali-impregnated carbonaceous precursor to main heat treatment in a non-oxidizing gas atmosphere at a temperature from 800° C. to 1500° C.; or (b2) subjecting the alkali-impregnated carbonaceous precursor to pre-heat treatment in a non-oxidizing gas atmosphere at a temperature 400° C. or higher and lower than 800° C., subjecting the alkali-impregnated carbonaceous precursor to main heat treatment in a non-oxidizing gas atmosphere at a temperature from 800° C. to 1500° C. and removing an alkali metal or a compound including an elemental alkali metal by washing.

[4] An anode for a non-aqueous electrolyte secondary battery including the carbonaceous material described in any one of [1] to [3].

[5] A non-aqueous electrolyte secondary battery including the carbonaceous material described in any one of [1] to [3].

[6] A method of producing a carbonaceous material for a non-aqueous electrolyte secondary battery anode including:

(1) impregnating an alkali metal to a carbonaceous material precursor containing from 1 to 25 wt. % of oxygen by adding a compound including an elemental alkali metal to obtain an alkali-impregnated carbonaceous precursor containing from 0.5 to 40 wt. % of an alkali metal (the content may be referred to as a "alkali-impregnated content" hereafter), wherein the alkali-impregnated carbonaceous precursor containing from 4 to 40 wt. % of an alkali metal is obtained in case of the carbonaceous material precursor containing 1 wt. % or greater and less than 9 wt. % of oxygen, or the alkali-impregnated carbonaceous precursor containing from 0.5 to 40 wt. % of an alkali metal is obtained in case of the carbonaceous material precursor containing from 9 to 25 wt. % of oxygen;

(2) subjecting the alkali-impregnated carbonaceous precursor to heat treatment by:

(a) subjecting the alkali-impregnated carbonaceous precursor to main heat treatment in a non-oxidizing gas atmosphere at a temperature from 800° C. to 1500° C.; or (b) subjecting the alkali-impregnated carbonaceous precursor to pre-heat treatment in a non-oxidizing gas atmosphere at a temperature 400° C. or higher and lower than 800° C., and subjecting the alkali-impregnated carbonaceous precursor to main heat treatment in a non-oxidizing gas atmosphere at a temperature from 800° C. to 1500° C.

[7] The method according to [6], wherein a source of carbon for the carbon precursor is a petroleum pitch or tar, a coal pitch or tar, a thermoplastic resin or a thermosetting resin.

[8] The method according to [6] or [7], wherein:

heat treatment step (2) (a) is:

(2) subjecting the alkali-impregnated carbonaceous precursor to heat treatment by:

(a1) subjecting the alkali-impregnated carbonaceous precursor to main heat treatment in a non-oxidizing gas atmosphere at a temperature from 800° C. to 1500° C. and removing an alkali metal or a compound including an elemental alkali metal by washing; and heat treatment step (2) (b) is:

(2) subjecting the alkali-impregnated carbonaceous precursor to heat treatment by:

(b1) subjecting the alkali-impregnated carbonaceous precursor to pre-heat treatment in a non-oxidizing gas atmosphere at a temperature 400° C. or higher and lower than 800° C., removing an alkali metal or a compound including an elemental alkali metal by washing, and subjecting the alkali-impregnated carbonaceous precursor to main heat treatment in a non-oxidizing gas atmosphere at a temperature from 800° C. to 1500° C.; or (b2) subjecting the alkali-impregnated carbonaceous precursor to pre-heat treatment in a non-oxidizing gas atmosphere at a temperature 400° C. or higher and lower than 800° C., subjecting the alkali-impregnated carbonaceous precursor to main heat treatment in a non-oxidizing gas atmosphere at a temperature from 800° C. to 1500° C. and removing an alkali metal or a compound including an elemental alkali metal by washing.

In Patent Document 4, a carbonaceous material including one or more types selected from the group consisting of an alkali metal, an alkaline earth metal and phosphorus at from 0.1 to 5.0 wt. % with respect to atomic content. However, a secondary battery including such a carbonaceous material did not achieve a large charge/discharge capacity. Also, a carbon material obtained by supporting a compound containing an alkali metal on a surface of a resin compound or the like, then subjecting the material to carbonization treatment, is also disclosed in Patent Document 5 and 6. However, a secondary battery including such a carbonaceous material, did not achieve a large charge/discharge capacity as well.

Advantageous Effects of Invention

A carbonaceous material for an anode of a non-aqueous electrolyte secondary battery according to an embodiment of the present invention may possess a fine porous structure suitable for storing lithium and a surface structure with low reactivity. Accordingly, such a carbonaceous material has a large doping capacity and de-doping capacity, and can reduce an irreversible capacity that may arise during an initial doping and de-doping. In addition, a non-aqueous electrolyte secondary battery having a high energy density can be obtained by the use of a carbonaceous material according to an embodiment of the present invention as an anode.

Furthermore, for a carbonaceous material for an anode of a non-aqueous electrolyte secondary battery according to an embodiment of the present invention, an increase in a specific surface area can be suppressed by the removal of a compound including an elemental alkali metal after pre-heat treatment.

DESCRIPTION OF EMBODIMENTS

[1] Carbonaceous material for non-aqueous electrolyte secondary battery anode A carbonaceous material for a non-aqueous electrolyte secondary battery anode according to an embodiment of the present invention is a carbonaceous material obtained by a production method including:

(1) impregnating an alkali metal to a carbonaceous material precursor by adding a compound including an elemental alkali metal to obtain an alkali-impregnated carbonaceous precursor;

(2) subjecting the alkali-impregnated carbonaceous precursor to heat treatment by:

(a) subjecting the alkali-impregnated carbonaceous precursor to main heat treatment in a non-oxidizing gas atmosphere at a temperature from 800° C. to 1500° C.; or (b) subjecting the alkali-impregnated carbonaceous precursor to pre-heat treatment in a non-oxidizing gas atmosphere at a temperature 400° C. or higher and lower than 800° C., and subjecting the alkali-impregnated carbonaceous precursor to main heat treatment in a non-oxidizing gas atmosphere at a temperature from 800° C. to 1500° C. Also, a carbonaceous material for an anode of a non-aqueous electrolyte secondary battery according to an embodiment of the present invention is a carbonaceous material, wherein a true density of the carbonaceous material is from 1.35 to 1.60 g/cm$^3$; a specific surface area of the carbonaceous material obtained by BET method using nitrogen adsorption is not greater than 30 m$^2$/g;

an average particle size of the carbonaceous material is not greater than 50 μm; and an atom ratio of hydrogen and carbon of the carbonaceous material obtained by elemental analysis, H/C, is not greater than 0.1.

(1) Production Method for a Carbonaceous Material for an Anode of a Non-Aqueous Electrolyte Secondary Battery A carbonaceous material for an anode of a non-aqueous electrolyte secondary battery according to an embodiment of the present invention can be produced by a method including the alkali-impregnating step (1) and the heat treatment step (2). The alkali-impregnating step (1) is preferably a step of:

(1) impregnating an alkali metal to a carbonaceous material precursor containing from 1 to 25 wt. % or greater of oxygen by adding a compound including an elemental alkali metal to obtain an alkali-impregnated carbonaceous precursor containing from 0.5 to 40 wt. % of an alkali metal, wherein the alkali-impregnated carbonaceous precursor containing from 4 to 40 wt. % of an alkali metal is obtained in the case of the carbonaceous material precursor containing 1 wt. % or greater and less than 9 wt. % of oxygen, or the alkali-impregnated carbonaceous precursor containing from 0.5 to 40 wt. % of an alkali metal is obtained in the case of the carbonaceous material precursor containing from 9 to 25 wt. % of oxygen.

Alkali-Impregnating Step (1)

In the alkali-impregnating step (1), a compound containing an elemental alkali metal is added to a carbonaceous material precursor.

Carbonaceous Material Precursor

A carbonaceous material precursor, which is a source of carbon for the carbonaceous material according to an embodiment of the present invention, is not particularly limited as long as the carbonaceous material precursor is a carbon material that has a composition of elemental carbon content not less than 80 wt. % after heat treatment at 1100° C. or higher in a non-oxidizing atmosphere.

If a carbonization yield of the carbonaceous material precursor at 1100° C. is too low, a ratio of an elemental alkali metal or an alkali metal compound may become excessive relative to the carbonaceous material precursor in the heat treatment step (2) described below. Such an excessive ratio is not preferable because it leads to a reaction such as an increase in a specific surface area. Consequently, the carbonization yield after the heat treatment of the carbonaceous material precursor at 1100° C. in a non-oxidizing atmosphere is preferably not less than 30 wt. %, more preferably not less than 40 wt. % and even more preferably not less than 50 wt. %. The carbonaceous material precursor in the present specification is not particularly limited, but the ratio of a hydrogen atom and a carbon atom (H/C) is preferably not less than 0.05, more preferably not less than 0.15 and even more preferably not less than 0.30. A carbon precursor with H/C ratio less than 0.05 may be heat-treated before alkali-impregnating. For such a carbonaceous material precursor, an alkali metal or the like may not be impregnated sufficiently into the precursor upon alkali-impregnating. Therefore, the formation of cavities sufficient enough to allow doping and de-doping of large quantity of lithium may be hindered even if the heat treatment is performed after alkali-impregnating.

The carbon source of the carbonaceous material precursor is not particularly limited, and examples include petroleum pitch or tar, or coal pitch or tar, or thermoplastic resins (for example, ketone resins, polyvinyl alcohol, polyethylene terephthalate, polyacetal, polyacrylonitrile, styrene/divinylbenzene copolymer, polyimide, polycarbonate, modified polyphenylene ether, polybutylene terephthalate, polyarylate, polysulfone, polyphenylene sulfide, polyimide resin, fluororesin, polyamideimide, aramid resin or polyetheretherketone), and thermosetting resins (for example, epoxy resin, urethane resin, urea resin, diallylphthalate resin, polyester resin, polycarbonate resin, silicon resin, polyacetal resin, nylon resin, furan resin, phenol resin, melamine resin, amino resin, and amide resin).

The true density of the carbonaceous material according to an embodiment of the present invention is from 1.35 g/cm$^3$ to 1.60 g/cm$^3$. If a petroleum pitch or tar, a coal pitch or tar, or a thermoplastic resin is used as a carbon source for the carbonaceous material precursor, a non-graphitizable carbonaceous material precursor can be obtained by crosslinking (infusibilization) treatment such as oxidation treatment. Therefore, infusibilization is preferable, but the carbonaceous material of the present invention can be obtained without infusibilization. The non-graphitizable carbon material precursor is preferable compared to a graphitizable carbon material precursor, because a large capacity can be achieved with an addition of small amount of alkali. The purpose of performing crosslinking treatment on the tar or pitch is to control the structure for the tar or pitch after crosslinking treatment continuously from a graphitizable carbon material precursor to a non-graphitizable carbon material precursor. Examples of tar or pitch that can be used include petroleum tar or pitch produced as a by-product during ethylene production, coal tar produced during dry-distillation of coal, a heavy component or pitch obtained after the low-boiling-point components are distilled out from coal tar, or tar or pitch obtained by coal liquefaction. Two or more of these types of tar and pitch may also be mixed together.

Infusibilization Treatment

As a method of crosslinking petroleum pitch or tar, coal pitch or tar, or thermoplastic resins, examples include the use of a crosslinking agent and the treatment by an oxidizer such as air.

When a crosslinking agent is used, a carbon precursor is obtained by adding a crosslinking agent to the petroleum pitch or tar or coal pitch or tar and mixing the substances while heating so as to promote crosslinking reactions. For example, a polyfunctional vinyl monomer, with which crosslinking reactions are promoted by radical reactions, such as divinylbenzene, trivinylbenzene, diallyl phthalate, ethylene glycol dimethacrylate, or N,N-methylene bis-acrylamide may be used as a crosslinking agent. Crosslinking reactions caused by the polyfunctional vinyl monomer are initiated by adding a radical initiator. Here, α,α'-azobis-isobutyronitrile (AIBN), benzoyl peroxide (BPO), lauroyl peroxide, cumene hydroperoxide, dicumyl peroxide, 1-butyl hydroperoxide, hydrogen peroxide, or the like can be used as a radical initiator.

In addition, when crosslinking reactions are promoted by treating the material with an oxidizer such as air, it is preferable to obtain the carbon precursor with the following method. Specifically, after a 2- or 3-ring aromatic compound with a boiling point of 200° C. or higher or a mixture thereof is added to a petroleum or coal pitch as an additive and mixed while stirring, the mixture is molded to obtain a pitch compact. Next, after the additive is extracted and removed from the pitch compact with a solvent having low solubility with respect to the pitch and having high solubility with respect to the additive so as to form a porous pitch, the porous pitch is oxidized using an oxidizer to obtain a carbon precursor. The purpose of the aromatic additive described above is to make the compact porous by extracting and removing the additive from the pitch compact that has been molded so as to facilitate crosslinking treatment by means of oxidation and to make the carbonaceous material obtained after carbonization porous. Such an additive may be selected, for example, from one type of naphthalene, methyl naphthalene, phenyl naphthalene, benzyl naphthalene, methyl anthracene, phenanthrene, or biphenyl or a mixture of two or more types thereof. The added amount of the additive relative to the pitch is preferably in the range of from 30 to 70 parts by weight per 100 parts by weight of pitch. To achieve a homogeneous mixture of the pitch and the additive, they are mixed in the molten state while heating. The mixture of the pitch and the additive is preferably molded into particles with a particle size of 1 mm or less so that the additive can be easily extracted from the mixture. Molding may be performed in the molten state, or by a method such as cooling and then pulverizing the mixture. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the compact of the mixture of pitch and additive using such a solvent, the additive can be removed from the compact while the shape of the compact is maintained. It is surmised that holes are formed by the additive in the compact at this time, and a pitch compact having uniform porosity can be obtained.

Furthermore, as a method for preparing a porous pitch compact other than the above method, the following method may be used. Petroleum pitch or coal pitch or the like is pulverized to an average particle size (median diameter) of not greater than 60 μm. Thereafter, the fine powdered pitch, preferably fine powdered pitch having an average particle size (median diameter) of not less than 5 μm and not greater than 40 μm, is compression molded to form a porous compression molded compact. For compression molding, an existing molding machine may be used, specific examples of which include a single-action vertical molder, a continuous rotary molder, and a roll compression molder, but it is not limited thereto. The pressure during compression molding is preferably a surface pressure of 20 to 100 MPa or a linear pressure of 0.1 to 6 MN/m, and more preferably a surface pressure of 23 to 86 MPa or a linear pressure of 0.2 to 3 MN/m. The holding time of pressure during compression molding may be determined as appropriate according to the type of molding machine and the properties and treated quantity of the fine powdered pitch, but is generally in the range of 0.1 second to 1 minute. A binder may be compounded as necessary when the fine powdered pitch is molded by compression. Specific examples of the binder include water, starch, methylcellulose, polyethylene, polyvinyl alcohol, polyurethane, and phenol resin, but the binder is not necessarily limited thereto. The shape of the porous pitch compact obtained by compression molding may be particles, round cylinders, spheres, pellets, plates, honeycombs, blocks, Raschig rings, and the like, without particular limitation.

In order to crosslink the obtained porous pitch, it is then preferably oxidized using an oxidizer at a temperature of 120 to 400° C. An oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. It is convenient and economically advantageous to perform crosslinking treatment by oxidizing the material at 120 to 400° C. using a gas containing oxygen such as air or a mixed gas of air and another gas such as a combustible gas, for example, as an oxidizer. In this case, if the softening point of the pitch is low, the pitch melts during oxidation, which makes oxidation difficult. Thus, the pitch that is used preferably has a softening point of 150° C. or higher.

The carbonaceous material precursor may not be pulverized or may be pulverized to reduce the particle size. Pulverization may be performed before infusibilization, after infusibilization (before alkali-impregnating), and/or after alkali-impregnating. That is, the pulverization can deliver an appropriate particle size for infusibilization, an appropriate particle size for alkali-impregnating, or an appropriate particle size for heat treatment. The pulverizer used for pulverization is not particularly limited, and a jet mill, a rod mill, a ball mill, or a hammer mill, for example, can be used.

As stated above, pulverization may be arranged in any order. However, it is preferable that the carbonaceous material precursor is uniformly impregnated with alkali, then subjected to heat treatment, so that a large charge/discharge capacity can be obtained as an effect of the present invention. Accordingly, the pulverization is preferably performed before the alkali-impregnating. Specifically, it is preferable to perform pulverization step, alkali-impregnating step (1), and heat treatment step (2), in this order. Pulverization to the average particle size of from 1 to 50 μm in the pulverization step is preferable so that the target particle size of the carbonaceous material can be achieved.

Though the average particle size of the carbonaceous material precursor is not particularly limited, impregnating of alkali metal compound may not be uniform and a large charge/discharge capacity may not be achieved if the average particle size is too large. The upper limit of the average particle size of the carbonaceous material precursor is preferably not greater than 600 μm, more preferably not greater than 100 μm and particularly preferably not greater than 50 μm. On the other hand, the specific surface area may increase, thereby increasing the irreversible capacity, if the average particle size is too small. Also, scattering of the particles or the like may increase. Therefore, the lower limit of the average particle size of the carbonaceous material precursor is preferably not less than 1 μm, more preferably not less than 3 μm and particularly preferably not less than 5 μm.

Oxygen Content (Degree of Oxygen Crosslinking)

The oxygen content in case of infusibilization by oxidation of the carbonaceous material precursor is not particularly limited as long as the effect of the present invention can be achieved. Note that, in the present specification, oxygen included in the carbonaceous material precursor may be the oxygen introduced by oxidation (infusibilization) or the oxygen included inherently. However, in the present specification, the degree of oxygen crosslinking by oxidation may be used as the same meaning as the oxygen content, because the oxygen atoms included in the carbon precursor by the oxidation reaction often function to crosslink the molecules of the carbon precursor together.

If the infusibilization treatment via oxygen crosslinking is not performed, the oxygen content (the degree of oxygen crosslinking) may be 0 wt. %. The lower limit of the oxygen content (the degree of oxygen crosslinking) is preferably not less than 1 wt. %, more preferably not less than 2 wt. %, even more preferably not less than 4 wt. % and most preferably not less than 9 wt. %. If the oxygen content (the degree of oxygen crosslinking) is less than 1 wt. %, the true density becomes too large to reduce the pore in which lithium is stored. Furthermore, the upper limit of the oxygen content (the degree of oxygen crosslinking) is preferably not greater than 25 wt. %, more preferably not greater than 20 wt. % and even more preferably not greater than 18 wt. %. If the oxygen content (the degree of oxygen crosslinking) is greater than 25 wt. %, the true density is reduced and the charge/discharge capacity per volume also decreases, which is not preferable.

True Density of Carbon Precursor

Because the true density of the carbon material depends on the arrangement of hexagonal-network planes, so-called fine structures and the degree of crystal perfection, the true density of the carbon material is an effective index for carbon structure. The carbonaceous material can be obtained by the heat treatment of the carbonaceous material precursor. Because the true density of the carbonaceous material changes corresponding to the heat treatment temperature, the true density of the carbonaceous material obtained by treating the carbonaceous material precursor at a certain temperature is effective as an index for the structure of the carbonaceous material precursor. The true density of the carbonaceous material precursor is not particularly limited, as long as the true density of the carbonaceous material obtained is in the range of from 1.35 to 1.60 $g/cm^3$. For the carbonaceous material precursor used preferably for the present invention, however, the lower limit of the carbonaceous material, which is obtained by heat treatment of such a carbonaceous material precursor at 1100° C. in a nitrogen atmosphere for 1 hour, is preferably not less than 1.40 $g/cm^3$, more preferably not less than 1.45 $g/cm^3$, and even more preferably 1.50 $g/cm^3$. The upper limit of the true density is preferably not greater than 1.70 $g/cm^3$, more preferably not greater than 1.65 $g/cm^3$, and even more preferably not greater than 1.60 $g/cm^3$. By making the true density of the carbonaceous material, which is obtained by heat treatment of the carbonaceous material precursor at 1100° C. in a nitrogen atmosphere for 1 hour, in a range of from 1.40 to 1.70 $g/cm^3$, the true density of the carbonaceous material obtained can be controlled to a range of from 1.35 to 1.60 $g/cm^3$.

Elemental Alkali Metal or Compound Containing Elemental Alkali Metal

For an elemental alkali metal contained in an alkali metal compound that is impregnated in the carbonaceous material precursor, an elemental alkali metal such as lithium, sodium or potassium may be used. The lithium compound presents problems such as the small effect of expanding spaces in comparison to other alkali metal compounds, and the smaller reserves in comparison to other elemental alkali metals. On the other hand, if a potassium compound is subjected to heat treatment with co-presence of carbon in a reducing atmosphere, the potassium compound may produce a metal potassium, which presents high reactivity toward moisture compared to other elemental alkali metals. As such, the potassium compound may present the issue of high danger. From the viewpoints described above, sodium is preferable as the elemental alkali metal. By using sodium, the carbonaceous material exhibiting a large charge/discharge capacity can be obtained.

The elemental alkali metal can be impregnated as the form of metal in the carbonaceous material precursor, or as a compound containing the elemental alkali metal (may be referred to as an alkali metal compound or an alkali compound), such as hydroxides, carbonates, hydrogencarbonates or halogen compounds. The alkali metal compound is not particularly limited, but hydroxides or carbonates, particularly hydroxides, are preferred, because permeability thereof is so high that the compound can be impregnated uniformly into the carbonaceous material precursor.

Alkali-Metal-Impregnated Carbonaceous Precursor

By adding an elemental alkali metal or an alkali metal compound to the carbonaceous material precursor, an alkali-impregnated carbonaceous precursor can be obtained. The method of adding the elemental alkali metal or the alkali metal compound is not limited. For example, a predetermined amount of the elemental alkali metal or the alkali metal compound may be added in a power form to the carbonaceous material precursor. An alkali metal compound solution may be prepared by dissolving the alkali metal compound in an appropriate solvent. After mixing such an alkali metal compound solution with the carbonaceous material precursor, the carbonaceous material precursor impregnated with the alkali metal compound may be prepared by evaporating the solvent. Specifically, though not particularly limited, an aqueous solution may be prepared by dissolving an alkali metal hydroxide such as sodium hydroxide in water, which is good solvent, and added to the carbonaceous material precursor. Addition of the alkali metal compound to the carbonaceous material precursor can be achieved by heating such a mixture to the temperature of 50° C. or higher, then removing moisture therefrom at ambient pressure or reduced pressure. The carbon precursor is often hydrophobic. If the carbon precursor exhibits low compatibility with the alkali aqueous solution, appropriate addition of alcohol can improve the compatibility of the carbonaceous material precursor to the alkali aqueous solution. If the alkali metal hydroxide is used, the alkali metal hydroxide absorbs carbon dioxide upon impregnating treatment in air, and the alkali metal hydroxide may be transformed into the alkali metal carbonate, which reduces the permeation of the alkali metal compound into the carbonaceous material precursor. Therefore, the concentration of carbon dioxide in the atmosphere is preferably reduced. Removal of moisture may be sufficient if the fluidity of the alkali-impregnated carbonaceous precursor is retained.

The impregnated content of the alkali metal compound impregnated in the carbonaceous material precursor is not particularly limited, but the upper limit of the added content is preferably not greater than 40.0 wt. %, more preferably not greater than 30.0 wt. % and even more preferably not greater than 20.0 wt. %. If the impregnated content of the alkali metal compound is too large, excessive alkali activation may occur. It is not preferable as, as a result, the specific surface area may increase and thereby increasing the irreversible capacity. In addition, the lower limit of the impregnated content is not particularly limited, but is preferably not less than 0.5 wt. %, more preferably not less than 1.0 wt. %, even more preferably not less than 3.5 wt. %, and most preferably not less than 4 wt. %. It is not preferable for the added amount of the alkali metal compound to be too small, as formation of the fine pore structure for doping and de-doping may become difficult.

Relationship Between Oxygen Content (Degree of Oxygen Crosslinking) and Alkali-Impregnated Content To obtain the carbonaceous material of the present invention with the true density of from 1.35 to 1.60 g/cm$^3$, the oxygen content (the degree of oxygen crosslinking) and the alkali-impregnated content are preferably adjusted appropriately. In other words, to obtain the true density of from 1.35 to 1.60 g/cm$^3$, the oxygen content (the degree of oxygen crosslinking) and the alkali-impregnated content can be adjusted. Specifically, if the oxygen content (the degree of oxygen crosslinking) is low and the alkali-impregnated content is low, the carbonaceous material which can lead to the large charge/discharge capacity can not be obtained because the true density is greater than 1.60 g/cm$^3$, as described in Comparative Examples 3 and 5. For example, if the oxygen content (the degree of oxygen crosslinking) is not less than 1 wt. % and less than 9 wt. % and the alkali-impregnated content is less than 4 wt. %, the true density may exceed 1.60 g/cm$^3$ and the carbonaceous material, which leads to the large charge/discharge capacity can not be obtained. However, the true density can be reduced to not greater than 1.60 g/cm$^3$ by increasing the alkali-impregnated content, if the oxygen content (the degree of oxygen crosslinking) is low. Alternatively, the true density can be reduced to not greater than 1.60 g/cm$^3$ by increasing the oxygen content (the degree of oxygen crosslinking), if the alkali-impregnated content is low.

Accordingly, though the oxygen content (the degree of oxygen crosslinking) in the carbonaceous material precursor is from 1 to 25 wt. % or greater and the alkali-impregnated content in the alkali-impregnated carbonaceous precursor is from 0.5 to 40 wt. % in the method of production of the present invention. However, the case in which the oxygen content (the degree of oxygen crosslinking) is not less than 1 wt. % and less than 9 wt. % and the alkali-impregnated content is not less than 0.5 wt. % and less than 4 wt. % is excluded from the combination of the oxygen content (the degree of oxygen crosslinking) and the alkali-impregnated content. Therefore, if the oxygen content (the degree of oxygen crosslinking) is not less than 1 wt. % and less than 9 wt. %, the alkali-impregnated content is not less than 4 wt. % and if the oxygen content (the degree of oxygen crosslinking) is from 9 to 25 wt. %, the alkali-impregnated content is from 0.5 wt. % to 40 wt. %.

Heat Treatment Step (2)

The heat treatment step includes subjecting the alkali-impregnated carbonaceous precursor to heat treatment by:

(a) subjecting the alkali-impregnated carbonaceous precursor to main heat treatment in a non-oxidizing gas atmosphere at a temperature from 800° C. to 1500° C.; or (b) subjecting the alkali-impregnated carbonaceous precursor to pre-heat treatment in a non-oxidizing gas atmosphere at a temperature 400° C. or higher and lower than 800° C., and subjecting the alkali-impregnated carbonaceous precursor to main heat treatment in a non-oxidizing gas atmosphere at a temperature from 800° C. to 1500° C. The heat treatment step to obtain the carbonaceous material for an anode of a non-aqueous electrolyte secondary battery of the present invention may include the pre-heat treatment followed by the main heat treatment as in the operation of (b) described above, or main heat treatment without pre-heat treatment as in the operation of (a) as described above.

Pre-Heat Treatment

The pre-heat treatment can remove volatile matter such as $CO_2$, $CO$, $CH_4$, and $H_2$, and the tar content. Also, if the alkali-impregnated carbonaceous precursor is subjected to heat treatment at a high temperature directly, a large amount of degradation products may be produced from the alkali-impregnated carbonaceous precursor. These degradation products may involve in a secondary degradation reaction at the high temperature, and are possibly deposited on the surface of the carbon material to decrease the battery performance, or are possibly deposited inside the furnace causing the plugging of the furnace. Therefore, it is preferable to perform the pre-heat treatment prior to the main heat treatment so that the amount of the degradation products can be reduced during the main heat treatment. If the temperature of the pre-heat treatment is too low, such degradation products may not be sufficiently removed. On the other hand, if the temperature of the pre-heat treatment is too high, the degradation products may involve in reactions such as a secondary degradation reaction. The temperature of the pre-heat treatment is preferably at 400° C. or higher but lower than 800° C., and more preferably 500° C. or higher but lower than 800° C. If the temperature of the pre-heat treatment is lower than 400° C., the removal of tar becomes insufficient, and the amount of tar or gas generated in the main heat treatment step after pulverization becomes large. This may deposit onto the particle surface resulting in the loss of appropriate surface properties after pulverization and cause a decrease in battery performance. On the other hand, if the temperature of the pre-heat treatment is 800° C. or higher, the temperature exceeds the tar-generating temperature range, and the used energy efficiency decreases. Furthermore, the generated tar causes a secondary degradation reaction, and the tar deposits on the carbon precursor and causes a decrease in performance.

The pre-heat treatment is performed in a non-oxidizing gas atmosphere, and examples of the non-oxidizing gas include helium, nitrogen, or argon. In addition, the pre-heat treatment can be performed under reduced pressure, for example, at a pressure of 10 kPa or less. The pre-heat treatment time is not particularly limited, but pre-heat treatment may be performed for 0.5 to 10 hours, for example, and is preferably performed for 1 to 5 hours.

Pulverization

Because the elemental alkali metal or the alkali metal compound can be impregnated uniformly and can impregnate easily into the carbonaceous material precursor, it is preferable to impregnate the elemental alkali metal or the alkali metal compound to the carbonaceous material precursor with a smaller particle size. Therefore, it is preferable to perform pulverization to the carbonaceous material precursor prior to the pre-heat treatment. However, because there may be a case in which the carbonaceous material precursor may melt during the pre-heat treatment, the particle size can be adjusted by pulverization after pre-heat treatment of the carbonaceous material precursor beforehand. The pulverization step may also be performed after carbonization (main heat treatment). However, when the carbonization reaction progresses, the carbon precursor becomes hard, which makes it difficult to control the particle size distribution by means of pulverization. Therefore, the pulverization step is preferably performed after pre-heat treatment at a temperature of 800° C. or lower and before the main heat treatment. Pulverization can make the particle size of the carbonaceous material of the present invention to a range of from 1 to 50 μm. The pulverizer used for pulverization is not particularly limited, and a jet mill, a rod mill, a vibratory ball mill, or a hammer mill, for example, can be used, but a jet mill equipped with a classifier is preferable.

Washing Alkali Metal and Alkali Metal Compound

In the heat treatment step (2) of the present invention, it is preferable to remove alkali metal and alkali metal compound (removal of alkali compound). If the large amount of the alkali metal and the alkali metal compound remains in the carbonaceous material, the carbonaceous material becomes strongly alkaline. For example, when PVDF (polyvinylidene fluoride) is used as a binder to prepare an anode, PVDF may become a gel if the carbonaceous material is strongly alkali. Also, if the alkali metal remains in the carbonaceous material, the alkali metal may migrate to the opposite electrode during the discharge of the secondary battery, causing adverse effects on the charge/discharge characteristics. Therefore, it is preferable to remove the alkali metal compound from the carbonaceous material precursor.

That is, washing of the alkali metal and the alkali metal compound is performed in order to prevent alkali metal compound from remaining in the carbonaceous material. If the impregnated content of the elemental alkali metal and the like is small, the residual amount of the alkali metal becomes less but the doping/de-doping capacity of lithium tends to decrease. If the temperature of the heat treatment is high, the alkali metal evaporates and the residue amount thereof decreases. If the temperature of the head treatment is too high, the size of the pore for lithium storage becomes too small and the doping/de-doping capacity decreases, which is not preferable. Therefore, if the impregnated content of the elemental alkali metal or the like is large, and the temperature of the heat treatment is low, it is preferable to perform washing of the alkali metal and alkali metal compound to reduce the residual amount of the alkali metal. The case in which the impregnated content of the elemental alkali metal is large is not particularly limited, but the examples include the case in which the impregnated content is greater than 15.0 wt. %. That is, it is preferable to perform the washing of the alkali metal and the alkali metal compound if the alkali-impregnated content is not less than 20.0 wt. %, not less than 25.0 wt. % or not less than 30.0 wt. %, for example.

Washing of the alkali metal and the alkali metal compound is not particularly limited, but can be performed before the main heat treatment or after the main heat treatment. Accordingly, the heat treatment step (2)(a) described above may be step (2) subjecting the alkali-impregnated carbonaceous precursor to heat treatment by:

(a1) subjecting the alkali-impregnated carbonaceous precursor to main heat treatment in a non-oxidizing gas atmosphere at a temperature from 800° C. to 1500° C. and removing an alkali metal or a compound including an elemental alkali metal by washing. Or the heat treatment step (2)(b) described above may be the step (2) subjecting the alkali-impregnated carbonaceous precursor to heat treatment by:

(b1) subjecting the alkali-impregnated carbonaceous precursor to pre-heat treatment in a non-oxidizing gas atmosphere at a temperature 400° C. or higher and lower than 800° C., removing an alkali metal or a compound including an elemental alkali metal by washing, and subjecting the alkali-impregnated carbonaceous precursor to main heat treatment in a non-oxidizing gas atmosphere at a temperature from 800° C. to 1500° C.; or (b2) subjecting the alkali-impregnated carbonaceous precursor to pre-heat treatment in a non-oxidizing gas atmosphere at a temperature 400° C. or higher and lower than 800° C., subjecting the alkali-impregnated carbonaceous precursor to main heat treatment in a non-oxidizing gas atmosphere at a temperature from 800° C. to 1500° C. and removing an alkali metal or a compound including an elemental alkali metal by washing.

Removal of the alkali metal and the alkali metal compound can be performed by the conventional method. Specifically, removal of the alkali metal and the alkali metal compound can be performed in gas phase or in liquid phase. In the case of gas phase removal, the heat treatment is performed at a temperature higher than the boiling points of the alkali metal and the alkali metal compound, thereby evaporating them. In the case of liquid phase removal, the following procedure can be performed.

To remove the alkali metal and the alkali metal compound from the carbonaceous material precursor, it is preferable to treat the carbonaceous material precursor by pulverizing the alkali-impregnated carbonaceous material precursor as is to make fine particles, then immersing the fine particles in acids such as hydrochloric acid or water. That is, acid washing or water washing is preferable, and particularly, treatment by immersion in water is preferable. The acids or water used may be at room temperature, or may be heated (e.g. hot water). If the particle size of the particles to be treated for washing the alkali metal and the alkali metal compound is large, the degree of washing may be reduced. The average particle size of the particles to be treated is preferably not greater than 100 μm and more preferably not greater than 50 μm. Washing of alkali metal and alkali metal compound is not particularly limited, but it is advantageous from the viewpoint of improving the degree of washing to perform washing to the carbon precursor obtained by the pre-heat treatment.

Washing of the alkali compound can be performed by immersing the material to be treated in acids such as hydrochloric acid or water and extracting/removing the elemental alkali metal and the alkali metal compound. The effective immersion treatment for washing the alkali metal compound is repeating a short-time immersion treatment rather than one long immersion treatment. Washing of the alkali metal compound may be performed by immersion treatment in acids followed by two or more times of water immersion treatment.

Main Heat Treatment

The main heat treatment in the production method of the present invention can be performed in accordance with an ordinary main heat treatment procedure, and a carbonaceous material for a non-aqueous electrolyte secondary battery anode can be obtained by performing main heat treatment. The main heat treatment temperature is from 800 to 1500° C. The lower limit of the main heat treatment temperature in the present invention is 800° C. or higher, more preferably 1100° C. or higher, and particularly preferably 1150° C. or higher. If the heat treatment temperature is too low, carbonization may be insufficient and the irreversible capacity may become large. Also, by increasing the heat treatment temperature, it is possible to evaporate and remove the alkali metal from the carbonaceous material thereby enabling the removal of the alkali metal compound by water washing and the like. Conversely, if the heat treatment temperature is low, the alkali may not be sufficiently removed. Also, a large amount of functional groups remain in the carbonaceous material, the value of H/C increases, and the irreversible capacity also increases due to a reaction with lithium. The upper limit of the main heat treatment temperature in the present invention is 1500° C. or lower, more preferably 1400° C. or lower, and particularly preferably 1300° C. or lower. If the main heat treatment temperature is higher than 1500° C., the number of pores formed as storing sites for lithium may decrease, and doping and de-doping capacity may decrease. In other words, selective orientation of a hexagonal-network plane of carbons may be more pronounced and the discharge capacity may decrease.

Main heat treatment is preferably performed in a non-oxidizing gas atmosphere. Examples of non-oxidizing gases include helium, nitrogen, and argon, and these may be used alone or as a mixture. In addition, main heat treatment can be performed under reduced pressure at a pressure of 10 kPa or lower, for example. The main heat treatment time is not particularly limited, but main heat treatment can be performed for 0.1 to 10 hours, for example, and is preferably performed for 0.3 to 8 hours, and more preferably for 0.4 to 6 hours.

(2) Properties of Carbonaceous Material for Non-Aqueous Electrolyte Secondary Battery Anode The carbonaceous material for an anode of a non-aqueous electrolyte secondary battery according to an embodiment of the present invention is a carbonaceous material, wherein a true density of the carbonaceous material is from 1.35 to 1.60 g/cm$^3$;

a specific surface area of the carbonaceous material obtained by BET method using nitrogen adsorption is not greater than 30 m$^2$/g;

an average particle size of the carbonaceous material is not greater than 50 μm; and an atom ratio of hydrogen and carbon of the carbonaceous material obtained by elemental analysis, H/C, is not greater than 0.1.

True Density

The true density of a graphitic material having an ideal structure is 2.27 g/cm$^3$, and the true density tends to decrease as the crystal structure becomes disordered. Accordingly, the true density can be used as an index expressing the carbon structure. The true density in the present specification is measured by the pycnometer method using butanol.

The true density of the carbonaceous material of the present invention is from 1.35 g/cm$^3$ to 1.60 g/cm$^3$. The upper limit of the true density is preferably not greater than 1.58 g/cm$^3$ and more preferably not greater than 1.55 g/cm$^3$. A lower limit of the true density is preferably not less than 1.38 g/cm$^3$, and is more preferably not less than 1.40 g/cm$^3$. A carbonaceous material having a true density of 1.60 g/cm$^3$ or greater has a small number of pores with a size capable of storing lithium, and the doping and de-doping capacity is also small. In addition, increases in true density involve the selective orientation of the hexagonal-network plane of carbons. Thus, the carbonaceous material often undergoes expansion and contraction at the time of lithium doping and de-doping, which is not preferable. On the other hand, a carbonaceous material having a true density of less than 1.35 g/cm$^3$ may not be capable of maintaining a stable structure as a storing site for lithium because the electrolyte solution may enter the fine pores. Furthermore, the electrode density decreases and thus causes a decrease in the volume energy density.

The true density of the carbonaceous material of the present invention may depend on a raw material of the carbonaceous material precursor, the oxygen content, and the added amount of the alkali. For example, in general, the true density tends to be larger if the raw material of the carbonaceous material precursor is coal instead of petroleum. The carbonaceous material, the raw material of which is coal, may have a true density of greater than 1.60 g/cm$^3$. In addition, as shown in Comparative Examples 3 and 5 described below, the true density may be greater than 1.60 g/cm$^3$, if at least one of the oxygen content and the alkali-impregnated content is low. A person skilled in the art can control the true density not greater than 1.60 g/cm$^3$ by controlling the oxygen content and the added amount of alkali. That is, the true density can be controlled to not greater than 1.60 g/cm$^3$ by controlling the infusibilization treatment (oxygen crosslinking or oxygen content) and alkali impregnating.

Specific Surface Area

The specific surface area may be determined with an approximation formula derived from a BET formula based on nitrogen adsorption. The specific surface area of the carbonaceous material of the present invention is not greater than 30 m$^2$/g. If the specific surface area exceeds 30 m$^2$/g, reactions with the electrolyte solution increase, which may lead to an increase in irreversible capacity and therefore a decrease in battery performance. The upper limit of the specific surface area is preferably not greater than 30 m$^2$/g, more preferably not greater than 20 m$^2$/g, and even more preferably not greater than 10 m$^2$/g. Also, the lower limit of the specific surface area is not particularly limited, but if the specific surface area is less than 0.5 m$^2$/g, the input/output characteristics may deteriorate. Therefore, the lower limit of the specific surface area is preferably not less than 0.5 m$^2$/g.

Average Particle Size ($D_{v50}$)

The average particle size ($D_{v50}$) of the carbonaceous material of the present invention is preferably from 1 to 50 μm. The lower limit of the average particle size is preferably not less than 1 μm, more preferably not less than 1.5 μm and particularly preferably not less than 2.0 μm. If the average particle size is less than 1 μm, the specific surface area also increases by increase in the number of the fine powder. Accordingly, the reactivity with an electrolyte solution increases, and the irreversible capacity, which is a capacity that is charged but not discharged, also increases, and the percentage of the cathode capacity that is wasted thus increases. Thus, this is not preferable. The upper limit of the average particle size is preferably not greater than 40 μm and more preferably not greater than 35 μm. When the average particle size exceeds 50 μm, the diffusion free path of lithium within particles increases, which makes rapid charging and discharging difficult. Furthermore, in the case of a secondary battery, increasing the electrode area is important for improving the input/output characteristics, so it is necessary to reduce the coating thickness of the active material on the current collector at the time of electrode preparation. In order to reduce the coating thickness, it is necessary to reduce the particle size of the active material. From this perspective, the upper limit of the average particle size is preferably not greater than 50 μm.

Atom Ratio of Hydrogen Atoms and Carbon Atoms (H/C)

The H/C ratio was determined by measuring hydrogen atoms and carbon atoms by elemental analysis. Since the hydrogen content of the carbonaceous material decreases as the degree of carbonization increases, the H/C ratio tends to decrease. Accordingly, the H/C ratio is effective as an index expressing the degree of carbonization. The H/C ratio of the carbonaceous material of the present invention is 0.10 or less and preferably 0.08 or less. The H/C ratio is particularly preferably 0.05 or less. If the H/C ratio of hydrogen atoms to carbon atoms exceeds 0.10, the amount of functional groups present in the carbonaceous material increases, and the irreversible capacity increases due to a reaction with lithium.

Elemental Alkali Metal Content

The elemental alkali metal content of the carbonaceous material of the present invention is not particularly limited, but is preferably from 0.05 to 5 wt. %. The lower limit of the elemental alkali metal content is more preferably 0.5 wt. %. The upper limit of the elemental alkali metal content is more preferably 4 wt. %, even more preferably 3 wt. % and most preferably 1.5 wt. % or less. If the elemental alkali metal content is too large, the carbonaceous material becomes strongly alkaline, and PVDF, the binder, may become a gel or adverse effects may appear in the charge/discharge characteristics. Therefore, it is preferable to remove the impregnated alkali by washing the alkali metal and alkali metal compounds to make the elemental alkali metal content from 0.05 to 5 wt. %.

[2] Non-Aqueous Electrolyte Secondary Battery Anode

Production of Anode

The anode that includes the carbonaceous material of the present invention can be produced by adding a binder to the carbonaceous material, adding appropriate amount of suitable solvent, kneading to form an electrode mixture, subsequently, coating, with the electrode mixture, a collector formed from a metal plate or the like and drying, and then pressure-forming. An electrode having high conductivity can be produced by using the carbonaceous material of the present invention without particularly adding a conductivity agent, but a conductivity agent may be added as necessary when preparing the electrode mixture for the purpose of imparting even higher conductivity. As the conductivity agent, acetylene black, Ketjenblack, carbon nanofibers, carbon nanotubes, carbon fibers or the like can be used. The added amount of the conductivity agent differs depending on the type of the conductivity agent that is used, but if the added amount is too small, the expected conductivity cannot be achieved, which is not preferable. Conversely, if the added amount is too large, dispersion of the conductivity agent in the electrode mixture becomes poor, which is not preferable. From this perspective, the proportion of the added amount of the conductivity agent is preferably from 0.5 to 15 wt. % (here, it is assumed that the active material (carbonaceous material)+the amount of the binder+the amount of the conductivity agent=100 wt. %), more preferably from 0.5 to 7.0 wt. %, and particularly preferably from 0.5 to 5.0 wt. %. The binder is not particularly limited as long as the binder does not react with an electrolyte solution such as polyvinylidene fluoride (PVDF), polytetrafluoroethylene, and a mixture of styrene-butadiene rubber (SBR) and carboxymethyl cellulose (CMC). Of these, PVDF is preferable since the PVDF attached on the surface of an active material does not inhibit migration of lithium-ions and excellent input/output characteristics is achieved. In order to form a slurry by dissolving PVDF, a polar solvent such as N-methylpyrrolidone (NMP) can be preferably used. However, aqueous emulsion, such as SBR, or CMC can be also used by dissolving in water. When the added amount of the binder is too large, since the resistance of the resulting electrode becomes large, the internal resistance of the battery becomes large. This diminishes the battery characteristics, which is not preferable. If the added amount of the binder is too small, the bonds between the anode material particles, and the bonds between the anode material particles and the current collector become insufficient, which is not preferable. Preferable amount of the binder that is added differs depending on the type of the binder that is used. However, the amount of binder is, if a PVDF-based binder is used, preferably from 3.0 to 13.0 wt. %, and more preferably from 3.0 to 10.0 wt. %. On the other hand, in the case of a binder using water as a solvent, a plurality of binders such as a mixture of SBR and CMC are often used in combination. The total amount of all of the binders that are used is preferably from 0.5 to 5.0 wt. % and more preferably from 1.0 to 4.0 wt. %. The electrode active material layer is typically formed on both sides of the current collector, but the layer may be formed on one side as necessary. The number of required current collectors or separators becomes smaller as the thickness of the electrode active material layer increases, which is preferable for increasing capacity. It is more advantageous from the perspective of improving the input/output characteristics for the electrode area of opposite electrodes to be wider, however, when the active material layer is too thick, the input/output characteristics are diminished, which is not preferable. The thickness of the active material layer (on each side) is not particularly limited and in a range of from 10 μm to 1000 μm, but preferably from 10 to 80 μm, more preferably from 20 to 75 μm, and particularly preferably from 20 to 60 μm. The anode ordinarily has a current collector. SUS, copper, nickel, or carbon, for example, can be used as an anode current collector, but of these, copper or SUS is preferable.

[3] Non-Aqueous Electrolyte Secondary Battery

If an anode for a non-aqueous electrolyte secondary battery is formed using the anode material of the present invention, the other materials constituting the battery such as the cathode material, separators, and the electrolyte solution are not particularly limited, and various materials that have been conventionally used or proposed for non-aqueous solvent secondary batteries can be used.

Cathode Production

The cathode contains a cathode active material and may further contain a conductivity agent and/or a binder. The mixing ratio of the cathode active material and the other material in the cathode active material layer is not limited and may be determined appropriately as long as the effect of the present invention can be achieved.

The cathode active material can be used without limiting the cathode active material. For example, layered oxide-based (as represented by $LiMO_2$, where M is a metal such as $LiCoO_2$, $LiNiO_2$, $LiMnO_2$, or $LiNi_xCo_yMnzO_2$ (where x, y, and z represent composition ratios)), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable, and these chalcogen compounds may be mixed as necessary.

Three-component-type [Li(Ni—Mn—Co)$O_2$] material, which is stabilized by the use of three elements, cobalt, nickel and manganese, by substituting the part of cobalt in lithium cobaltate by nickel and manganese, is known. Also, NCA-type material, [Li—(Ni—Co—Al)$O_2$], in which aluminum is used instead of manganese in the three-component-type material above, is also known. Such materials can be used.

The cathode may further contain a conductivity agent and/or a binder. Examples of conductivity agents include acetylene black, Ketjenblack, and carbon fibers. The content of the conductivity agent is not limited but may be from 0.5 to 15 wt. %, for example. An example of the binder is a fluorine-containing binder such as PTFE or PVDF. The content of the conductivity agent is not limited but may be from 0.5 to 15 wt. %, for example. The thickness of the cathode active material layer is not limited but is within the range of from 10 μm to 1000 μm, for example.

The cathode active material layer ordinarily has a current collector. SUS, aluminum, nickel, iron, titanium, and carbon, for example, can be used as an anode current collector, and of these, aluminum or SUS is preferable.

Electrolyte Solution

A non-aqueous electrolyte solution used with this cathode and anode combination is typically formed by dissolving an electrolyte in a non-aqueous solvent. As the non-aqueous solvent, for example, one type or a combination of two or more types of organic solvents, such as propylene carbonate, ethylene carbonate, dimethyl carbonate, diethyl carbonate, dimethoxy ethane, diethoxy ethane, γ-butyl lactone, tetrahydrofuran, 2-methyltetrahydrofuran, sulfolane, or 1,3-dioxolane can be used. Furthermore, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$ and the like can be used as an electrolyte. The secondary battery is typically formed by immersing, in an electrolyte solution, a cathode layer and an anode layer, which are produced as described above, that are arranged facing each other via, as necessary, a liquid permeable separator formed from nonwoven fabric and other porous materials. As a separator, a liquid permeable separator formed from nonwoven fabric and other porous materials that is typically used in secondary batteries can be used. Alternatively, in place of a separator or together with a separator, a solid electrolyte formed from polymer gel in which an electrolyte solution is impregnated can be also used.

Suitable Structure of Anode Material

A suitable structure of the anode material for non-aqueous electrolyte secondary battery has, first of all, pores that enable doping and de-doping of large amount of lithium in the anode material. The pores of the carbonaceous material include a porous structure having a wide pore size. However, the pore which allows an electrolyte solution to enter is perceived as an exterior surface in terms of electrochemistry, and not a possible stable site for lithium. As a lithium storage site, a pore does not allow the electrolyte solution to enter, while the pore allows lithium to reach very corner of the pore during the lithium doping. The pore that allows lithium to reach every corner of the pore is a pore, in which lithium naturally diffuses along the carbon skeleton, and also, lithium may diffuses into the carbon by expanding the hexagonal-network planes of carbons.

Secondly, the suitable structure for an anode for non-aqueous electrolyte secondary battery is a structure that enables the irreversible capacity, which is the difference between the doping capacity and the de-doping capacity observed during the initial stage of the doping reaction and the de-doping reaction, to be small. That is, it is the structure, in which there is little degradation reaction of the electrolyte solution on the surface of the carbon. Because a graphitic material is known to degrade the electrolyte solution, the carbon skeleton is preferable a non-graphitic material. Also, because the surface of the edge of the carbonaceous material promotes the reaction, it is preferable to suppress formation of edges during the formation of the pore structure.

The material for non-aqueous electrolyte secondary battery anodes of the present invention is obtained by subjecting the alkali-impregnated carbonaceous precursor to heat treatment, and it is considered that the true density of from 1.35 to 1.60 g/cm$^3$ allows the anode material to have the pores which enable doping and de-doping of lithium. Furthermore, there is little degradation reaction of the electrolyte solution on the carbon surface.

EXAMPLES

The present invention will be described in detail hereafter using examples, but these examples do not limit the scope of the present invention.

The measurement methods for the physical properties of the carbonaceous material precursor according to the present invention ("the atom ratio of hydrogen/carbon (H/C)", "the specific surface area", and "the true density") the physical properties of the carbonaceous material for a non-aqueous electrolyte secondary battery according to the present invention ("the atom ratio of hydrogen/carbon (H/C)", "the specific surface area", "the true density determined by a butanol method", "the average particle size determined by the laser diffraction method", and "the elemental alkali metal content") will be described hereinafter. The physical properties described in this specification, including those in the examples, are based on values determined by the following methods.

Atom Ratio (H/C) of Hydrogen/Carbon

The atom ratio was measured in accordance with the method prescribed in JIS M8819. The ratio of the numbers of hydrogen/carbon atoms was determined from the mass ratio of hydrogen and carbon in a sample obtained by elemental analysis using a CHN analyzer.

Oxygen Content

The oxygen content was measured in accordance with the method prescribed in JIS M8819. The oxygen content is determined by subtracting a percentages of carbon, hydrogen and nitrogen obtained from the elemental analysis by the CHN analyzer, from 100.

Specific Surface Area

The specific surface area was measured in accordance with the method prescribed in JIS Z8830. A summary is given below.

An approximation derived from the BET formula is given below.

$$v_m = 1/(v(1-x)) \qquad \text{[Equation 1]}$$

A value $v_m$ was determined by a one-point method (relative pressure x=0.2) based on nitrogen adsorption at the temperature of liquid nitrogen, and the specific area of the sample was calculated from the following equation:

specific area=$4.35 \times v_m$ (m$^2$/g)

(where, $v_m$ is the amount of adsorption (cm$^3$/g) required to form a monomolecular layer on the sample surface; v is the amount of adsorption (cm$^3$/g) actually measured, and x is the relative pressure).

Specifically, the amount of adsorption of nitrogen in the carbonaceous material at the temperature of liquid nitrogen was measured as follows using a "Flow Sorb II 2300" manufactured by Micromeritics Instrument Corporation.

A test tube was filled with the carbon material, and the test tube was cooled to −196° C. while infusing helium gas containing nitrogen gas at a concentration of 20 mol % so that the nitrogen was adsorbed in the carbon material. Next, the test tube was returned to room temperature. The amount of nitrogen desorbed from the sample at this time was measured with a thermal conductivity detector and used as the adsorption gas amount v.

True Density Determined by Pycnometer Method Using Butanol

Measurements were performed using butanol in accordance with the method prescribed in JIS R7212. A summary is given below. Note that both the carbonaceous material obtained by heat treatment of the carbonaceous material precursor at 1100° C. and the carbonaceous material of the present invention were measured using the same method.

The mass ($m_1$) of a pycnometer with a bypass line having an internal volume of approximately 40 mL was precisely measured. Next, after a sample was placed flat at the bottom of the pycnometer so that the thickness of the sample is approximately 10 mm, the mass ($m_2$) was precisely measured. Next, 1-butanol was slowly added to the pycnometer to a depth of approximately 20 mm from the bottom. Next, the pycnometer was gently oscillated, and after the fact that no large air bubbles were formed was confirmed, the pycnometer was placed in a vacuum desiccator and gradually evacuated to a pressure of 2.0 to 2.7 kPa. The pressure was maintained for 20 minutes or longer, and after the generation of air bubbles stopped, the pycnometer was removed and further filled with 1-butanol. After a stopper was inserted, the pycnometer was immersed in a constant-temperature water bath (adjusted to 30±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured. Next, the same pycnometer was filled with 1-butanol alone and immersed in a constant-temperature water bath in the same manner as described above. After the liquid surface was aligned with the marked line, the mass ($m_3$) was measured. In addition, distilled water which was boiled immediately before use and from which the dissolved gas was removed was placed in the pycnometer and immersed in a constant-temperature water bath in the same manner as described above. After the liquid surface was aligned with the marked line, the mass ($m_5$) was measured. The true density ($\rho_{Bt}$) is calculated using the following equation.

$$\rho_{Bt} = \frac{m_2 - m_1}{m_2 - m_1 - (m_4 - m_3)} \times \frac{m_3 - m_1}{m_5 - m_1} d \qquad \text{[Equation 2]}$$

(where, d is the specific gravity (0.9946) in water at 30° C.)

Average Particle Size

Three drops of a dispersant (cationic surfactant, "SN-WET 366" (manufactured by San Nopco Limited)) were added to approximately 0.1 g of a sample, and the dispersant was blended into the sample. Next, 30 mL of purified water was added, and after the sample was dispersed for approximately 2 minutes with an ultrasonic washer, the particle size distribution within a particle size range of 0.05 to 3000 μm was determined with a particle size distribution analyzer ("SALD-3000J" manufactured by Shimadzu Corporation).

The average particle size $D_{v50}$ (μm) was determined from the resulting particle size distribution as the particle size yielding a cumulative volume of 50%.

Elemental Alkali Metal Content

For the measurement of elemental alkali metal content, a carbon sample containing a predetermined elemental alkali metal was prepared. And a calibration curve, which is the relationship between a content of the elemental alkali and an X-ray intensity corresponding to each elemental alkali metal was determined in advance. Next, the X-ray intensity corresponding to the elemental alkali metal in fluorescent X-ray analysis was measured for samples, and the content of each elemental alkali was determined from the calibration curve created above.

Fluorescent X-ray analysis was performed by the X-ray fluorescence spectrometer manufactured by Rigaku-Denki Corp, using the following conditions. A holder for irradiating from upper part was used, and the measured area of the sample was within a circumferential line having the diameter of 20 mm. The sample to be measured was placed, the surface thereof was covered with a polyethylene terephthalate film, and the measurement was performed.

Example 1

First, 70 kg of a petroleum pitch with a softening point of 205° C., an atom ratio H/C of 0.65, and a quinoline insoluble content of 0.4% and 30 kg of naphthalene were charged into a pressure-resistant container with an internal volume of 300 liters and having a stirring blade and an outlet nozzle, and the substances were melted and mixed while heating. After the heat-melted and mixed petroleum pitch was cooled, the petroleum pitch was pulverized, and the obtained pulverized product was charged into water at 90 to 100° C., dispersed while stirring, and cooled to obtain a spherical pitch compact. After most of the water was removed by filtration, the naphthalene in the spherical pitch compact was extracted and removed with n-hexane. A porous spherical pitch obtained as described above was heated and oxidized by flowing the heated air, and heat-infusible porous spherical oxidized pitch was thus obtained. The oxygen content (the degree of oxygen crosslinking) of the porous spherical oxidized pitch was 6 wt. %.

Next, 200 g of the infusible porous spherical oxidized pitch was pulverized for 20 minutes with a jet mill (AIR JET MILL manufactured by Hosokawa Micron Co., Ltd.; MODEL 100AFG) to form a pulverized carbonaceous material precursor with an average particle size of from 20 to 25 μm. After the obtained pulverized carbonaceous material precursor was impregnated with a sodium hydroxide (NaOH) aqueous solution in a nitrogen atmosphere, the precursor was subjected to heat dehydration under reduced pressure to obtain a pulverized carbonaceous material precursor impregnated with 7.0 wt. % of NaOH with respect to the pulverized carbonaceous material precursor. Next, 10 g of the pulverized carbonaceous material precursor impregnated with sodium hydroxide (in terms of the mass of the pulverized carbon precursor) was placed in a horizontal tubular furnace and subjected to pre-heat treatment by holding the precursor for 10 hours at 600° C. in a nitrogen atmosphere. The precursor was further heated to 1150° C. at a heating rate of 250° C./h, held at 1150° C. for 1 hour as the main heat treatment to obtain carbonaceous material 1. Main heat treatment was performed in a nitrogen atmosphere with a flow rate of 10 L/min. Note that the average particle size of the obtained carbonaceous material was 19 μm.

Example 2

In the same manner in Example 1, after the obtained pulverized carbonaceous material precursor was impregnated with a sodium hydroxide aqueous solution in a nitrogen atmosphere, the precursor was subjected to heat dehydration under reduced pressure to obtain a pulverized carbonaceous material precursor impregnated with 15.0 wt. % of sodium hydroxide with respect to the pulverized carbonaceous material precursor. Next, 10 g of the pulverized carbonaceous material precursor impregnated with sodium hydroxide (in terms of the mass of the pulverized carbon precursor) was placed in a horizontal tubular furnace and subjected to pre-heat treatment by holding the precursor for 10 hours at 600° C. in a nitrogen atmosphere and left cooled. The carbonaceous material precursor after the pre-heat treatment was placed in a beaker, washed thoroughly with deionized water and the alkali metal compound was removed. After filtration, the material was dried in a nitrogen atmosphere at 105° C. Next, the carbonaceous material precursor after water-washing was heated to 1100° C. at a heating rate of 250° C./h. This was held for 1 hour at 1100° C. and subjected to main heat treatment to prepare a carbonaceous material 2. Main heat treatment was performed in a nitrogen atmosphere with a flow rate of 10 L/min. Note that the average particle size of the obtained carbonaceous material was 19 μm.

Example 3

The carbonaceous material 3 was prepared by repeating the operation in Example 1, except the oxygen content (the degree of oxygen crosslinking) was 8 wt. % instead of 6 wt. % and the temperature of the main heat treatment was 1200° C. instead of 1150° C. Note that the average particle size of the obtained carbonaceous material was 19 μm.

Example 4

The carbonaceous material 4 was prepared by repeating the operation in Example 1, except the oxygen content (the degree of oxygen crosslinking) was 13 wt. % instead of 6 wt. %, the alkali-impregnated content was 1.0 wt. % instead of 7 wt. % and the temperature of the main heat treatment was 1200° C. instead of 1150° C. Note that the average particle size of the obtained carbonaceous material was 20 μm.

Example 5

The carbonaceous material 5 was prepared by repeating the operation in Example 1, except the oxygen content (the degree of oxygen crosslinking) was 13 wt. % instead of 6 wt. %, and the alkali-impregnated content was 2.4 wt. % instead of 7.0 wt. %. Note that the average particle size of the obtained carbonaceous material was 20 μm and the elemental alkali metal content was 1.5 wt. %.

Example 6

The carbonaceous material 6 was prepared by repeating the operation in Example 5, except the temperature of the main heat treatment was 1200° C. instead of 1150° C. Note that the average particle size of the obtained carbonaceous material was 20 μm.

Example 7

The carbonaceous material 7 was prepared by repeating the operation in Example 6, except the average particle size of the carbonaceous material precursor was 11 μm instead of from 20 to 25 μm. Note that the average particle size of the obtained carbonaceous material was 9 μm.

Example 8

The carbonaceous material 8 was prepared by repeating the operation in Example 6, except the average particle size of the carbonaceous material precursor was 6 μm instead of from 20 to 25 μm. Note that the average particle size of the obtained carbonaceous material was 5 μm.

Example 9

The carbonaceous material 9 was prepared by repeating the operation in Example 6, except the alkali-impregnated content was 7.0 wt. % instead of 2.4 wt. %. Note that the average particle size of the obtained carbonaceous material was 20 μm.

Example 10

The carbonaceous material 10 was prepared by repeating the operation in Example 6, except the oxygen content (the degree of oxygen crosslinking) was 14 wt. % instead of 13 wt. %, and the alkali-impregnated content was 15.0 wt. % instead of 7.0 wt. %. Note that the average particle size of the obtained carbonaceous material was 20 μm.

Example 11

The carbonaceous material 11 was prepared by repeating the operation in Example 2, except the oxygen content (the degree of oxygen crosslinking) was 18 wt. % instead of 6 wt. %, the alkali-impregnated content was 30.0 wt. % instead of 15.0 wt. % and the temperature of the main heat treatment was 1200° C. instead of 1100° C. Note that the average particle size of the obtained carbonaceous material was 21 μm.

Example 12

The carbonaceous material 12 was prepared by repeating the operation in Example 3, except the oxygen content (the degree of oxygen crosslinking) was 18 wt. % instead of 8 wt. %, and the alkali metal compound to be impregnated was KOH instead of NaOH. Note that the average particle size of the obtained carbonaceous material was 21 μm.

Example 13

The porous spherical oxidized pitch of the oxygen content (the degree of oxygen crosslinking) of 18 wt. % instead of 6 wt. % was prepared by repeating the operation in Example 1, and subjected to heat treatment at 500° C. in a nitrogen atmosphere. Thus, the porous spherical carbonaceous material precursor was obtained. Next, the porous spherical carbonaceous material precursor was pulverized in the same manner as in Example 1, and the pulverized carbonaceous material precursor having an average particle size of from 20 to 25 μm was obtained. The carbonaceous material 13 was prepared by using the pulverized carbonaceous material precursor, by repeating the operation in Example 1, except the alkali-impregnated content was 15.0 wt. % instead of 7.0 wt. % and the temperature of the main heat treatment was 1200° C. instead of 1150° C. Note that the average particle size of the obtained carbonaceous material was 21 μm.

Example 14

The coal pitch was pulverized to an average particle size of from 20 to 25 μm, then heated and oxidized by flowing the heated air. Thus the pulverized carbonaceous material precursor, which was infusible to heat, was obtained. The oxygen content (the degree of oxygen crosslinking) of the pulverized carbonaceous material precursor was 8 wt. %. After the obtained pulverized carbonaceous material precursor was impregnated with a sodium hydroxide aqueous solution in a nitrogen atmosphere, the precursor was subjected to heat dehydration under reduced pressure to obtain a pulverized carbonaceous material precursor impregnated with 7.0 wt. % of sodium hydroxide with respect to the pulverized carbonaceous material precursor. Next, 10 g of the pulverized carbonaceous material precursor impregnated with sodium hydroxide (in terms of the mass of the pulverized carbon precursor) was placed in a horizontal tubular furnace and subjected to pre-heat treatment by holding the precursor for 10 hours at 600° C. in a nitrogen atmosphere. The precursor was further heated to 1200° C. at a heating rate of 250° C./h and held at 1200° C. for 1 hour as the main heat treatment to obtain a carbonaceous material 14. Main heat treatment was performed in a nitrogen atmosphere with a flow rate of 10 L/min. Note that the average particle size of the obtained carbonaceous material was 19 μm.

Comparative Example 1

The comparative carbonaceous material 1 was prepared by repeating the operation in Example 3, except the oxygen content (the degree of oxygen crosslinking) was 16 wt. % instead of 8 wt. %, and alkali impregnating was not performed. Note that the average particle size of the obtained carbonaceous material was 20 μm.

Comparative Example 2

The comparative carbonaceous material 2 was prepared by repeating the operation in Comparative Example 1, except the oxygen content (the degree of oxygen crosslinking) was 6 wt. % instead of 16 wt. %. Note that the average particle size of the obtained carbonaceous material was 19 μm.

Comparative Example 3

The comparative carbonaceous material 3 was prepared by repeating the operation in Example 6, except the oxygen content (the degree of oxygen crosslinking) was 6 wt. % instead of 13 wt. %. Note that the average particle size of the obtained carbonaceous material was 19 μm.

Comparative Example 4

The comparative carbonaceous material 4 was prepared by repeating the operation in Example 6, except the oxygen content (the degree of oxygen crosslinking) was 1 wt. % instead of 13 wt. %, and the alkali-impregnated content was 50.0 wt. % instead of 2.4 wt. %. Note that the average particle size of the obtained carbonaceous material was 15 μm. The production of an electrode was attempted using the carbonaceous material obtained, but the production was so difficult that it was impossible to measure the battery performance.

Comparative Example 5

The comparative carbonaceous material 5 was prepared by repeating the operation in Example 13, except the alkali-impregnated content was 1.0 wt. % instead of 7.0 wt. %. Note that the average particle size of the obtained carbonaceous material was 19 μm.

Comparative Example 6

The comparative carbonaceous material 6 was prepared by repeating the operation in Comparative Example 1, except the oxygen content (the degree of oxygen crosslinking) was 18 wt. % instead of 16 wt. % and the temperature of the main heat treatment was 800° C. instead of 1200° C. Note that the average particle size of the obtained carbonaceous material was 20 μm.

Comparative Example 7

The carbonaceous material 7 was prepared by repeating the operation in Comparative Example 6, except the temperature of the main heat treatment was 1500° C. instead of 800° C. Note that the average particle size of the obtained carbonaceous material was 20 μm.

Non-aqueous electrolyte secondary batteries were produced by means of the following operations (a) and (b) using the electrodes obtained in Examples 1 to 14 and Comparative Examples 1 to 7, and the electrode and battery performances thereof were evaluated.

(a) Production of Test Battery

Although the carbon material of the present invention is suitable for forming an anode for a non-aqueous electrolyte secondary battery, in order to precisely evaluate the discharge capacity (de-doping capacity) and the irreversible capacity (non-de-doping capacity) of the battery active material without being affected by fluctuation in the performances of the counter electrode, a lithium secondary battery was formed using the electrode obtained above together with a counter electrode including lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016 coin type test cell in advance, punching a thin sheet of metal lithium with a thickness of 0.8 mm into a disc shape with a diameter of 15 mm, and bonding the thin sheet of metal lithium by compression to the stainless steel mesh disc.

Using a pair of electrodes produced in this way, $LiPF_6$ was added at a proportion of 1.4 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine porous membrane separator made of borosilicate glass fibers with a diameter of 19 mm to assemble a 2016 coin-type non-aqueous electrolyte lithium secondary battery in an Ar glove box.

(b) Measurement of Battery Capacity

Charge-discharge tests were performed on a lithium secondary battery with the configuration described above using a charge-discharge tester ("TOSCAT" manufactured by Toyo System Co., Ltd.). Here, in a battery including a lithium chalcogen compound for a cathode, the doping reaction for doping lithium into the carbon electrode is called "charging", and in a battery including lithium metal for a counter electrode, as in the test battery of the present invention, the doping reaction for the carbon electrode is called "discharging". The manner in which the doping reactions for doping lithium into the same carbon electrode thus differs depending on the pair of electrodes used. Therefore, the doping reaction for inserting lithium into the carbon electrode will be described as "charging" hereafter for the sake of convenience. Conversely, "discharging" refers to a charging reaction in the test battery but is described as "discharging" for the sake of convenience since it is a de-doping reaction for removing lithium from the carbon material. For the doping reaction, the operation of flowing the current at 0.5 $mA/cm^2$ current density for 1 hour at the interval of 2 hours of rest was repeated until the equilibrium potential between the terminals reached 5 mV. The electric charge divided by the weight of the carbonaceous material used was defined as doping capacity, expressed in mAh/g. Next, the current was applied in the reverse direction in the same manner, the lithium doped in the carbonaceous material was de-doped. For the de-doping reaction, the operation of flowing the current at 0.5 $mA/cm^2$ current density for 1 hour at the interval of 2 hours of rest was repeated and the cut-off voltage was terminal potential of 1.5 V. At this time, a value determined by dividing the electrical discharge by the weight of the carbon material of the electrode is defined as the discharge capacity per unit weight of the carbon material (Ah/g). Furthermore, the product of discharge capacity per unit weight and the true density was defined as the discharge capacity per unit volume (Ah/L). Also, the discharge capacity per unit weight was divided by the charge capacity per unit weight to obtain charge/discharge efficiency. The charge/discharge efficiency was expressed in percentage (%). The charge/discharge capacities and charge/discharge efficiency were determined by averaging three measurements for test batteries produced using the same sample.

TABLE 1-I

| | Carbonaceous material precursor | | | | Alkali impregnating | | Alkali washing | |
|---|---|---|---|---|---|---|---|---|
| | Raw material | Oxygen content wt. % | H/C | True density $g/cm^3$ | Alkali type | Added amount wt. % | after pre-heat treatment at 600° C. | Main heat treatment temperature ° C. |
| Example 1 | Petroleum | 6 | 0.59 | 1.63 | NaOH | 7.0 | None | 1150 |
| Example 2 | Petroleum | 6 | 0.59 | 1.63 | NaOH | 15.0 | Yes | 1100 |
| Example 3 | Petroleum | 8 | 0.57 | 1.57 | NaOH | 7.0 | None | 1200 |
| Example 4 | Petroleum | 13 | 0.51 | 1.55 | NaOH | 1.0 | None | 1200 |
| Example 5 | Petroleum | 13 | 0.51 | 1.55 | NaOH | 2.4 | None | 1150 |
| Example 6 | Petroleum | 13 | 0.51 | 1.55 | NaOH | 2.4 | None | 1200 |
| Example 7 | Petroleum | 13 | 0.51 | 1.55 | NaOH | 2.4 | None | 1200 |
| Example 8 | Petroleum | 13 | 0.51 | 1.55 | NaOH | 2.4 | None | 1200 |
| Example 9 | Petroleum | 13 | 0.51 | 1.55 | NaOH | 7.0 | None | 1200 |
| Example 10 | Petroleum | 14 | 0.50 | 1.55 | NaOH | 15.0 | None | 1200 |
| Example 11 | Petroleum | 18 | 0.45 | 1.51 | NaOH | 30.0 | Yes | 1200 |
| Example 12 | Petroleum | 18 | 0.45 | 1.51 | KOH | 7.0 | None | 1200 |
| Example 13 | Petroleum | 18 | 0.35 | 1.51 | NaOH | 15.0 | None | 1200 |
| Example 14 | Coal | 8 | 0.50 | 1.64 | NaOH | 7.0 | None | 1200 |
| Comparative Example 1 | Petroleum | 16 | 0.48 | 1.52 | — | — | None | 1200 |
| Comparative Example 2 | Petroleum | 6 | 0.59 | 1.63 | — | — | None | 1200 |
| Comparative Example 3 | Petroleum | 6 | 0.59 | 1.63 | NaOH | 2.4 | None | 1200 |
| Comparative Example 4 | Petroleum | 2 | 0.63 | 1.95 | NaOH | 50 | None | 1200 |

TABLE 1-I-continued

| | Carbonaceous material precursor | | | Alkali impregnating | | Alkali washing | |
|---|---|---|---|---|---|---|---|
| | Raw material | Oxygen content wt. % | H/C | True density g/cm$^3$ | Alkali type | Added amount wt. % | after pre-heat treatment at 600° C. | Main heat treatment temperature ° C. |
| Comparative Example 5 | Coal | 8 | 0.57 | 1.64 | NaOH | 1.0 | None | 1200 |
| Comparative Example 6 | Petroleum | 18 | 0.45 | 1.51 | — | — | None | 800 |
| Comparative Example 7 | Petroleum | 18 | 0.45 | 1.51 | — | — | None | 1500 |

TABLE 1-II

| | Carbonaceous material | | | | | | |
|---|---|---|---|---|---|---|---|
| | Particle size μm | H/C | True density g/cm$^3$ | SSA m$^2$/g | Discharge capacity Ah/kg | Discharge capacity Ah/L | Charging and discharging Efficiency % |
| Example 1 | 19 | 0.03 | 1.58 | 1.8 | 514 | 812 | 85.4 |
| Example 2 | 19 | 0.04 | 1.54 | 1.7 | 538 | 829 | 84.2 |
| Example 3 | 19 | 0.02 | 1.54 | 4.6 | 529 | 815 | 85.3 |
| Example 4 | 20 | 0.02 | 1.54 | 2.1 | 514 | 792 | 88.9 |
| Example 5 | 20 | 0.03 | 1.53 | 1.8 | 554 | 848 | 87.7 |
| Example 6 | 20 | 0.02 | 1.53 | 2.3 | 530 | 811 | 89.2 |
| Example 7 | 9 | 0.02 | 1.53 | 5.1 | 532 | 811 | 88.7 |
| Example 8 | 5 | 0.02 | 1.53 | 9.2 | 533 | 811 | 88.0 |
| Example 9 | 20 | 0.02 | 1.50 | 2.4 | 550 | 825 | 86.8 |
| Example 10 | 20 | 0.03 | 1.40 | 11.6 | 580 | 812 | 84.2 |
| Example 11 | 21 | 0.03 | 1.45 | 4.9 | 551 | 799 | 84.6 |
| Example 12 | 21 | 0.02 | 1.51 | 2.9 | 551 | 832 | 87.0 |
| Example 13 | 21 | 0.02 | 1.48 | 4.2 | 533 | 789 | 87.0 |
| Example 14 | 19 | 0.02 | 1.59 | 3.3 | 508 | 808 | 85.2 |
| Comparative Example 1 | 20 | 0.02 | 1.52 | 3.1 | 473 | 719 | 88.4 |
| Comparative Example 2 | 19 | 0.02 | 1.63 | 2.0 | 414 | 675 | 88.4 |
| Comparative Example 3 | 19 | 0.02 | 1.61 | 1.8 | 468 | 753 | 88.4 |
| Comparative Example 4 | 18 | 0.03 | 1.09 | 1132 | 424 | 606 | 54.5 |
| Comparative Example 5 | 19 | 0.02 | 1.63 | 4.5 | 429 | 699 | 85.2 |
| Comparative Example 6 | 20 | 0.14 | 1.45 | 82 | 536 | 777 | 57.4 |
| Comparative Example 7 | 20 | 0.01 | 1.55 | 2.4 | 187 | 290 | 86.2 |

The secondary batteries including the carbonaceous materials of Examples 1 to 14, which were subjected to alkali impregnating exhibited excellent discharge capacity and charge/discharge efficiency. However, secondary batteries including the carbonaceous materials of Comparative Examples 1, 2 and 7, which were not subjected to alkali impregnating, did not achieve large charge/discharge capacities. Furthermore, secondary batteries including the carbonaceous materials of Comparative Examples 3 to 5, having a true density of 1.61, 1.09 and 1.63, did not achieve a large charge/discharge capacities.

Also, the carbonaceous material of Example 5 contained 1.5 wt. % of elemental sodium metal.

INDUSTRIAL APPLICABILITY

The non-aqueous electrolyte secondary battery of the present invention has a large discharge capacity and excellent charge/discharge efficiency. Therefore, the battery can be suitably used in hybrid electric vehicles (HEVs), plug-in hybrid electric vehicles (PHEVs), and electric vehicles (EVs).

The present invention has been described above using specific aspects of embodiment, but modifications and improvements apparent to persons having ordinary skill in the art are also included in the scope of the present invention.

The invention claimed is:

1. A method of producing a carbonaceous material for a non-aqueous electrolyte rechargeable battery anode comprising:
   (1) impregnating an alkali metal to a carbonaceous material precursor by adding a compound including an elemental alkali metal to obtain an alkali-impregnated carbonaceous precursor;
   (2) subjecting the alkali-impregnated carbonaceous precursor to heat treatment by:
      (a) subjecting the alkali-impregnated carbonaceous precursor to main heat treatment in a non-oxidizing gas atmosphere at a temperature from 800° C. to 1500° C.; or (b) subjecting the alkali-impregnated carbonaceous precursor to pre-heat treatment in a non-oxidizing gas atmosphere at a temperature 400° C. or higher and lower than 800° C., and subjecting the alkali-impregnated carbonaceous precursor to main heat treatment in a non-oxidizing gas atmosphere at a temperature from 800° C. to 1500° C.;

wherein a true density of the carbonaceous material is from 1.35 to 1.60 g/cm$^3$;

a specific surface area of the carbonaceous material obtained by BET method using nitrogen adsorption is not greater than 30 m$^2$/g;

an average particle size of the carbonaceous material is not greater than 50 μm; and an atom ratio of hydrogen and carbon of the carbonaceous material obtained by elemental analysis, H/C, is not greater than 0.1.

2. The method of producing a carbonaceous material for a non-aqueous electrolyte rechargeable battery anode according to claim 1, wherein a source of carbon for the carbonaceous material precursor is a petroleum pitch or tar, a coal pitch or tar, a thermoplastic resin or a thermosetting resin.

3. The method of producing a carbonaceous material for a non-aqueous electrolyte rechargeable battery anode according to claim 1, wherein:

the heat treatment step (2) (a) comprises:
(2) subjecting the alkali-impregnated carbonaceous precursor to heat treatment by:
(a1) subjecting the alkali-impregnated carbonaceous precursor to the main heat treatment in a non-oxidizing gas atmosphere at a temperature from 800° C. to 1500° C. and removing the alkali metal or the compound including the elemental alkali metal by washing; or the heat treatment step (2) (b) comprises:
(2) subjecting the alkali-impregnated carbonaceous precursor to heat treatment by:
(b1) subjecting the alkali-impregnated carbonaceous precursor to the pre-heat treatment in a non-oxidizing gas atmosphere at a temperature 400° C. or higher and lower than 800° C., removing the alkali metal or the compound including the elemental alkali metal by washing, and subjecting the alkali-impregnated carbonaceous precursor to the main heat treatment in a non-oxidizing gas atmosphere at a temperature from 800° C. to 1500° C.; or
(b2) subjecting the alkali-impregnated carbonaceous precursor to the pre-heat treatment in a non-oxidizing gas atmosphere at a temperature 400° C. or higher and lower than 800° C., subjecting the alkali-impregnated carbonaceous precursor to the main heat treatment in a non-oxidizing gas atmosphere at a temperature from 800° C. to 1500° C. and removing the alkali metal or the compound including the elemental alkali metal by washing.

4. A method of producing a carbonaceous material for a non-aqueous electrolyte secondary battery anode comprising:

(1) impregnating an alkali metal to a carbonaceous material precursor containing from 1 to 25 wt. % of oxygen by adding a compound including an elemental alkali metal to obtain an alkali-impregnated carbonaceous precursor containing from 0.5 to 40 wt. % of the alkali metal, wherein the alkali-impregnated carbonaceous precursor containing from 4 to 40 wt. % of the alkali metal is obtained in case of the carbonaceous material precursor containing 1 wt. % or greater and less than 9 wt. % of oxygen, or the alkali-impregnated carbonaceous precursor containing from 0.5 to 40 wt. % of the alkali metal is obtained in case of the carbonaceous material precursor containing from 9 to 25 wt. % of oxygen;

(2) subjecting the alkali-impregnated carbonaceous precursor to heat treatment by:
(a) subjecting the alkali-impregnated carbonaceous precursor to main heat treatment in a non-oxidizing gas atmosphere at a temperature from 800° C. to 1500° C.; or
(b) subjecting the alkali-impregnated carbonaceous precursor to pre-heat treatment in a non-oxidizing gas atmosphere at a temperature 400° C. or higher and lower than 800° C., and subjecting the alkali-impregnated carbonaceous precursor to main heat treatment in a non-oxidizing gas atmosphere at a temperature from 800° C. to 1500° C., wherein a true density of the carbonaceous material is from 1.35 to 1.60 g/cm$^3$; a specific surface area of the carbonaceous material obtained by BET method using nitrogen adsorption is not greater than 30 m$^2$/g; an average particle size of the carbonaceous material is not greater than 50 μm; and an atom ratio of hydrogen and carbon of the carbonaceous material obtained by elemental analysis, H/C, is not greater than 0.1.

5. The method according to claim 4, wherein a source of carbon for the carbonaceous material precursor is a petroleum pitch or tar, a coal pitch or tar, a thermoplastic resin or a thermosetting resin.

6. The method according to claim 4, wherein:

the heat treatment step (2) (a) comprises:
(2) subjecting the alkali-impregnated carbonaceous precursor to heat treatment by:
(a1) subjecting the alkali-impregnated carbonaceous precursor to the main heat treatment in a non-oxidizing gas atmosphere at a temperature from 800° C. to 1500° C. and removing the alkali metal or the compound including the elemental alkali metal by washing; or the heat treatment step (2) (b) comprises:
(2) subjecting the alkali-impregnated carbonaceous precursor to heat treatment by:
(b1) subjecting the alkali-impregnated carbonaceous precursor to the pre-heat treatment in a non-oxidizing gas atmosphere at a temperature 400° C. or higher and lower than 800° C., removing the alkali metal or the compound including the elemental alkali metal by washing, and subjecting the alkali-impregnated carbonaceous precursor to the main heat treatment in a non-oxidizing gas atmosphere at a temperature from 800° C. to 1500° C.; or
(b2) subjecting the alkali-impregnated carbonaceous precursor to the pre-heat treatment in a non-oxidizing gas atmosphere at a temperature 400° C. or higher and lower than 800° C., subjecting the alkali-impregnated carbonaceous precursor to the main heat treatment in a non-oxidizing gas atmosphere at a temperature from 800° C. to 1500° C. and removing the alkali metal or the compound including the elemental alkali metal by washing.

7. A method of producing an anode for a non-aqueous electrolyte secondary battery, comprising forming the anode for a non-aqueous electrolyte secondary battery by using the carbonaceous material according to claim 4.

8. A method of producing a non-aqueous electrolyte secondary battery, comprising forming the non-aqueous electrolyte secondary battery by using the carbonaceous material according to claim 4.

* * * * *